United States Patent
Bautista

(10) Patent No.: US 11,710,367 B2
(45) Date of Patent: Jul. 25, 2023

(54) AUTOMATED SYMBOL UPGRADE AND SYMBOL REMOVAL DURING LINK AND RESPIN FEATURE

(71) Applicant: IGT, Las Vegas, NV (US)

(72) Inventor: Jennifer Bautista, Albany, CA (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/212,123

(22) Filed: Mar. 25, 2021

(65) Prior Publication Data

US 2022/0309867 A1    Sep. 29, 2022

(51) Int. Cl.
*A63F 9/24* (2006.01)
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3267* (2013.01)

(58) Field of Classification Search
CPC .... G07F 17/34; G07F 17/326; G07F 17/3244; G07F 17/3209; G07F 17/3213; G07F 17/3267; G07F 17/3269
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 10,650,639 B2* | 5/2020 | Cormack | G07F 17/3262 |
| 2004/0048646 A1* | 3/2004 | Visocnik | G07F 17/32 463/16 |
| 2012/0172106 A1* | 7/2012 | Caputo | G07F 17/3244 463/20 |
| 2013/0157744 A1* | 6/2013 | Welty | G07F 17/3213 463/21 |
| 2015/0080092 A1* | 3/2015 | Caputo | G07F 17/3244 463/20 |
| 2015/0087385 A1* | 3/2015 | Shiraishi | G07F 17/3213 463/20 |
| 2016/0125693 A1* | 5/2016 | Berman | G06F 3/04817 463/21 |
| 2017/0092041 A1* | 3/2017 | Kudo | G07F 17/3267 |
| 2018/0225926 A1* | 8/2018 | Wortmann | G07F 17/3267 |
| 2019/0026975 A1* | 1/2019 | Casey | G07F 17/3209 |
| 2019/0355206 A1* | 11/2019 | Kania | G07F 17/3244 |
| 2020/0134970 A1* | 4/2020 | Penacho | G07F 17/3213 |

* cited by examiner

*Primary Examiner* — Justin L Myhr
(74) *Attorney, Agent, or Firm* — Sheridan Ross P.C.

(57) ABSTRACT

The present disclosure relates generally to systems and methods for providing symbol upgrade features in games. An illustrative method includes receiving a first input from a player interacting with a gaming device initiating a first play of a game, where the game comprises an array of cells. The method further includes determining that a randomly-generated first distribution of symbols includes a common symbol in a first cell and a second cell. The method further includes upgrading a cell in the array of cells with an upgrade symbol, where the upgrade symbol represents that the common symbol in the first cell and the second cell have been combined into the upgrade symbol in response to determining that the first cell and the second cell include the common symbol.

20 Claims, 18 Drawing Sheets

| A' | 1' | F' | 6' | K' |
|---|---|---|---|---|
| B' | 2' | G' | 7' | L' |
| C' 312a | Upgrade Symbol 408 | H' | 8' | M' |
| D' | Upgrade Symbol 408 | I' | 9' | N' |
| E' | 5' | J' | 10' | O' |

AUTOMATED SYMBOL UPGRADE AND SYMBOL REMOVAL DURING LINK AND RESPIN FEATURE

BACKGROUND

The present disclosure is generally directed to gaming systems and, in particular, toward gaming systems that enable link and respin operations for grid-based games.

Gaming machines typically offer a number of built-in game play features that contribute to the overall player experience. Any type of game play feature that presents the player with an additional opportunity to win is often viewed as desirable and can lead to increased play of the gaming machine.

BRIEF SUMMARY

In certain embodiments, the present disclosure relates to a gaming device, a method, and a system that provide automated symbol upgrade and symbol removal functions during a link and respin feature. In some embodiments, a gaming device is provided, include: a display; a processor coupled to the display; and a memory coupled with the processor and storing therein instructions that, when executed by the processor, cause the processor to: initiate a first play of a game, where the game includes an array of cells; render, by the display in response to initiating the first play of the game, a first distribution of symbols in the array of cells, where each cell in the array of cells includes a discrete symbol in the first distribution of symbols; determine that the first distribution of symbols includes a common symbol in a first cell and a second cell; upgrade a cell in the array of cells with an upgrade symbol, where the upgrade symbol represents that the common symbol in the first cell and the second cell have been combined into the upgrade symbol in response to determining that the first cell and the second cell include the common symbol; initiate a second play of the game, where the second play of the game occurs after the first play of the game; and render, by the display in response to initiating the second play of the game, a second distribution of symbols in the array of cells, where the cell includes the upgrade symbol in the second distribution of symbols and where cells in the array of cells other than the cell comprise a new discrete symbol in the second distribution of symbols.

In some embodiments, a method is provided, including: receiving, by a processor, a first input from a player interacting with a gaming device initiating a first play of a game, where the game includes an array of cells; rendering, by a display of the gaming device in response to receiving the first input, a randomly-generated first distribution of symbols in the array of cells, where each cell in the array of cells includes a discrete symbol in the randomly-generated first distribution of symbols; determining, with the processor, that the randomly-generated first distribution of symbols includes a common symbol in a first cell and a second cell; upgrading, with the processor, a cell in the array of cells with an upgrade symbol, where the upgrade symbol represents that the common symbol in the first cell and the second cell have been combined into the upgrade symbol in response to determining that the first cell and the second cell includes the common symbol; initiating, with the processor, a second play of the game; and rendering, by the display in response to initiating the second play of the game, a second distribution of symbols in the array of cells, where the cell includes the upgrade symbol in the second distribution of symbols and where cells in the array of cells other than the cell include a new discrete symbol in the second distribution of symbols.

In some embodiments, a system is provided, including: a processor; and a memory, coupled with the processor, including instructions that are executable by the processor, where the instructions include instructions that: initiate a first play of a game, where the game includes an array of cells; cause a first distribution of symbols to be displayed in the array of cells, where each cell in the array of cells includes a discrete symbol in the first distribution of symbols; determine that a first cell and a second cell both include a common symbol in the first distribution of symbols; determine that the first cell is adjacent to the second cell; upgrade the first cell with an upgrade symbol, where the upgrade symbol represents that the common symbol in the first cell and the second cell have been combined into the upgrade symbol in response to determining that the first cell and the second cell both include the common symbol and in response to determining that the first cell is adjacent to the second cell; initiate a second play of the game, where the second play of the game occurs after the first play of the game; and cause a second distribution of symbols to be displayed in the array of cells, where the first cell comprises the upgrade symbol in the second distribution of symbols and where cells in the array of cells other than the first cell include a new discrete symbol in the second distribution of symbols.

Additional features and advantages are described herein and will be apparent from the following Description and the figures.

BRIEF DESCRIPTION OF THE SEVERAL VIEWS OF THE DRAWINGS

FIG. 6B illustrates a transition from the distribution of symbols shown in FIG. 6A where an automated symbol upgrade operation has been performed in response to determining that two or more adjacent cells include a common symbol therein;

DETAILED DESCRIPTION

Figure 1A:
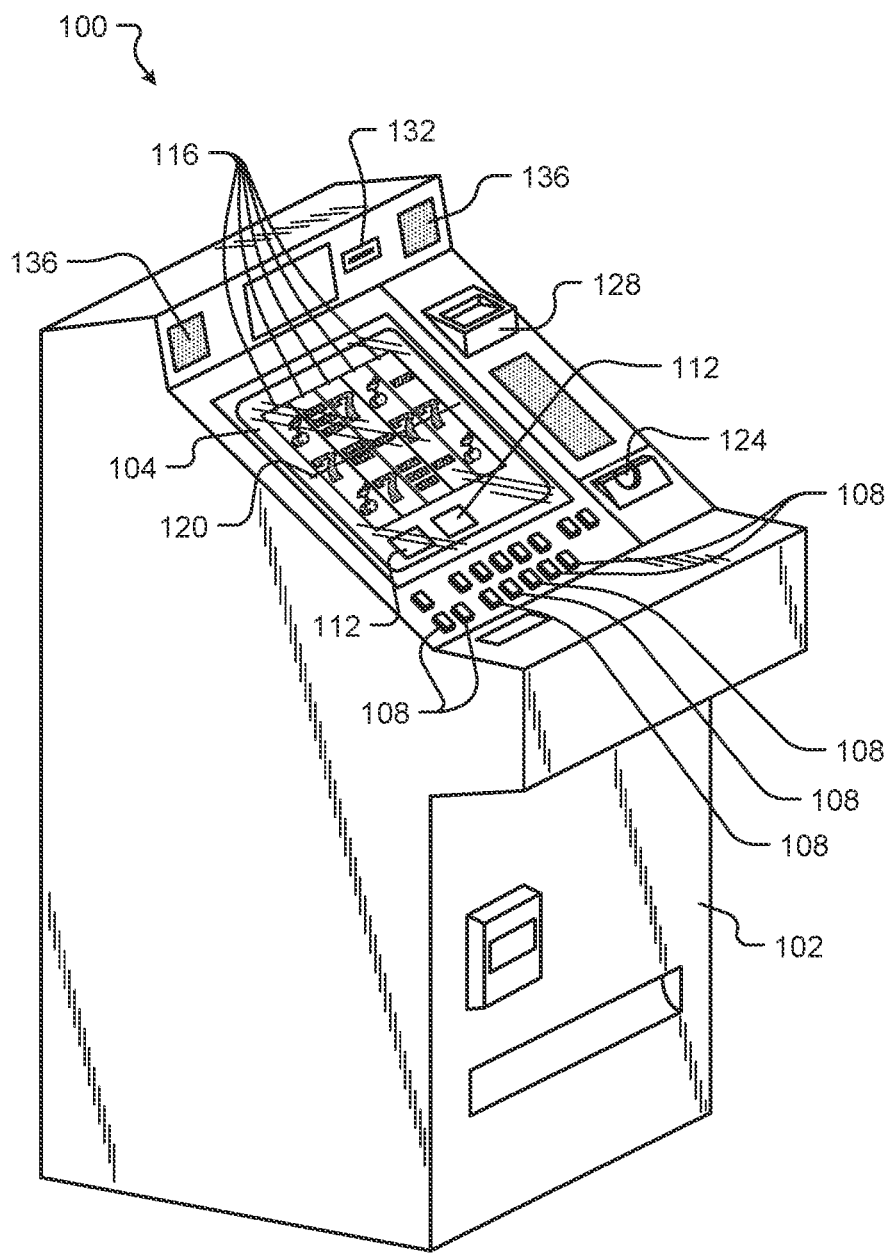
FIG. 1A depicts one example of a computational gaming device for enabling enhanced gaming features and symbol upgrade operations.

Embodiments of the present disclosure will be described in connection with gaming systems having one or multiple gaming devices that are capable of providing improved game features. Illustratively, a symbol upgrade and/or symbol removal feature are described as being features that can be automatically performed in response to a first distribution of symbols exhibiting certain predetermined characteristics. In some examples described herein, when the first distribution of symbols has at least two adjacent cells containing a common symbol, then an automated symbol upgrade and/or symbol remove feature may be performed.

Symbol hold and respin mechanics can be used in many different types of games. A familiar hold and respin mechanic that provides chances to upgrade wins and make room for more win opportunities during a respin can increase player excitement and game desirability. Certain hold and respin games are popular, but somewhat simple in their implementation. Embodiments of the present disclosure contemplate improvements to hold and respin games by increasing anticipation for growing wins in a limited game real estate (e.g., within the limited number of cells).

The symbol upgrade and/or symbol removal processes, which may or may not be automated, will be described as being performed in connection with a link and respin feature, but it should be appreciated that embodiments of the present disclosure are not so limited. Furthermore, while examples of the present disclosure will be described in connection with games that present an array of cells (e.g., slot games, reel-based games, etc.) that are primarily known as games of chance, it should be appreciated that the symbol upgrade and/or symbol removal processes can also be provided in other game types (e.g., games of skill, games of chance and skill, games of chance with bonus games of skill, non-reel-based games, etc.).

Gaming devices described herein may include a computational device, such as a slot machine or Electronic Gaming Machine (EGM), that implements a symbol upgrade and/or symbol removal process. While embodiments of the present disclosure will be described in connection with the example of a slot machine, or EGM implementing symbol upgrade and/or symbol removal operations, it should be appreciated that embodiments of the present disclosure are not so limited. For instance, other types of computational devices, such as portable user devices, smartphones, tablets, laptops, Personal Computers (PCs), wearable devices, etc. may be used to implement game enhancement features as part of a game as described herein. Furthermore, it should be appreciated that embodiments of the present disclosure may apply to games other than slot games or reel-based games. For instance, embodiments of the present disclosure may be used in connection with any type of game such as bingo, keno, slots, matching games, table games, etc.

The symbol upgrade operations and associated features may be activated, as described herein, during play of a game (e.g., a grid-based game), after a play of the game, and/or prior to a play of the game. As mentioned above, improved symbol operation may be made available within the context of a slot game, a matching game, a bingo game, a keno game, a poker machine, a game of skill, or in any other game that awards particular symbol combinations relative to positions on a user interface.

Among other things, embodiments of the present disclosure provide a player with more ways to win a game, heightened anticipation during gameplay, the ability to alter the chances of winning in a game, the ability to alter the payout amount for a winning game outcome, and add excitement to the overall game-playing experience of games.

Figure 1B:
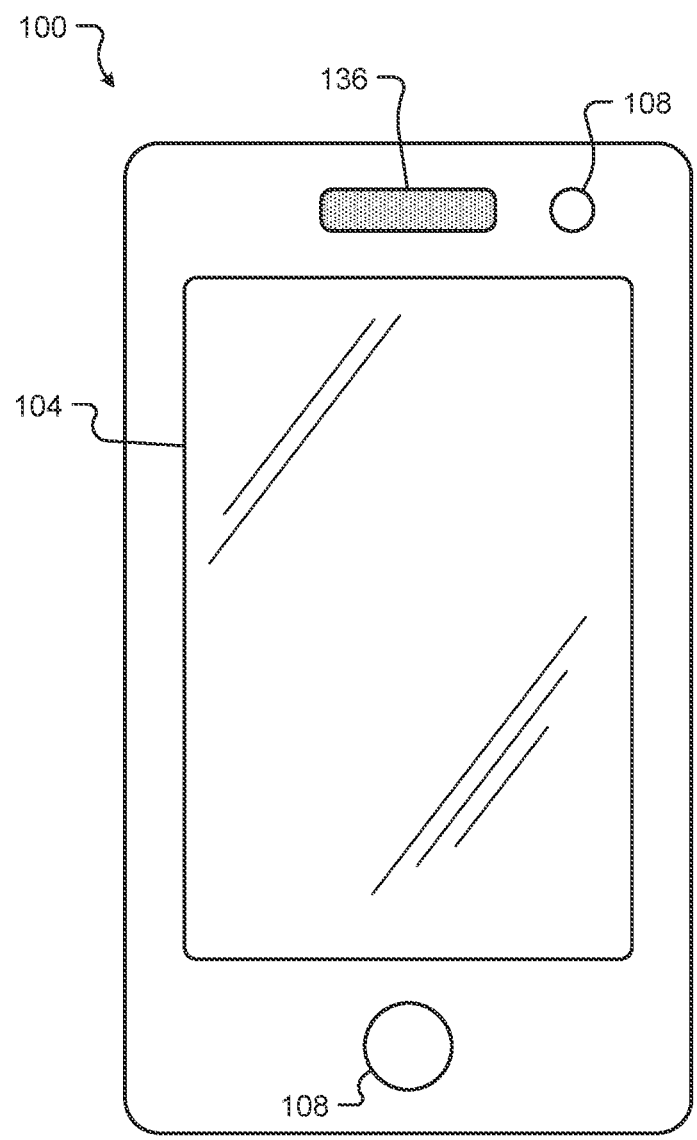
FIG. 1B depicts another example of a computational gaming device for enabling enhanced gaming features and symbol upgrade operations.

With reference now to FIGS. 1A and 1B, an illustrative computational device 100 that may be used to implement a grid-based game or the like will be described in accordance with at least some embodiments of the present disclosure. A computational device 100 may include a portable or non-portable device used for executing a gaming application or multiple different gaming applications without departing from the scope of the present disclosure. Non-limiting examples of a computational device include an EGM, a Video Gaming Machine (VGM), a mobile communication device (e.g., a smartphone, laptop, tablet, wearable device, etc.), a personal computer (PC), etc. An EGM or VGM-type of computational device 100 is shown in FIG. 1A in accordance with embodiments of the present disclosure.

The illustrative computational device 100 of FIG. 1A is shown to include a support structure, housing or cabinet, 102 which provides support for a plurality of displays, inputs, controls and other features of a conventional gaming machine. In the illustrated embodiment, a player plays the computational device 100 while sitting, however, the computational device 100 is alternatively configured so that a player can operate it while standing or sitting. The illustrated computational device 100 is positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The computational device 100 can be constructed with varying cabinet and display configurations.

In one embodiment, a computational device 100 is configured to randomly generate awards and/or other game outcomes based on probability data. Since a computational device 100 generates outcomes randomly or based upon a probability calculation, there is no certainty that the computational device 100 will provide the player with any specific award or other game outcome.

In some embodiments, a computational device 100 may employ a predetermined or finite set or pool of awards, progressive awards, prizes or other game outcomes. In such an embodiment, as each award or other game outcome is provided to the player, the computational device 100 removes the provided award or other game outcome from the predetermined set or pool. Once removed from the set or pool, the specific provided award or other game outcome cannot be provided to the player again. The computational device 100 may provide players with some or all of the available awards or other game outcomes over the course of a play cycle and may or may not guarantee a designated number of actual wins and losses.

The computational device 100 may include one or more displays 112. An illustrative display 112 may include a credit display that displays a player's current number of credits, cash, account balance or the equivalent. Another illustrative display 112 may include a bet display that displays a player's amount wagered.

The computational device 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the computational device 100.

In one embodiment, a player inserts an identification card into card reader 132 of computational device 100. The identification card can be a smart card having a programmed microchip or a magnetic strip coded with a player's identification, credit totals, and other relevant information. In one embodiment, money may be transferred to a credit meter of the computational device 100 through an electronic fund transfer and card reader 132 using the player's credit, debit, or smart card. When a player funds the computational device 100, a processor of the computational device 100 may determine the amount of funds entered and the corresponding amount is shown on the credit or other suitable display 112 as described herein.

In one embodiment, after appropriate funding of computational device 100, the player presses an input device 108 to initiate game play. The input devices 108 may include various types of buttons, levers, gesture inputs, cameras, etc., that enable a player to start any game play or sequence of events. In one embodiment, upon appropriate funding, computational device 100 begins game play automatically. In another embodiment, the player may be required to actuate or activate one of the play buttons to initiate play of computational device 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The computational device 100 may include other suitable wager buttons, such as a "repeat bet" button (e.g., repeating the bet made from the immediately last play of the computational device 100 for the next play of the computational device 100), one or more "select paylines" buttons, a "select re-spin operation" button, and one or more "select wager per payline" buttons.

Another type of input device 108 that may be provided on the computational device 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The computational device 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a computational device 100 provides dynamic sounds coupled with attractive multimedia images displayed on the display screen 104 to provide an audio-visual representation or to otherwise display full-motion video with sound to attract players to the computational device 100. During idle periods, the computational device 100 displays a sequence of audio and/or visual attraction messages to attract potential players to the computational device 100.

In one embodiment, a base or primary game includes a slot game with one or more paylines 120. As will be discussed in further detail herein, the game provided by the computational device 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 may be used to display different sets of symbols in connection with game play activity provided by the computational device 100. In some embodiments, each reel 116 may operate independent of all other reels and the symbols displayed by a reel 116 at the end of a given spin may depend upon random numbers generated by the computational device 100. The positions of symbols on each reel 116 and in the combination of reels 116 may form the array of symbols distributed throughout an array of cells. The distribution of symbols may be presented in a presentation order rendered to the display screen 104 of the computational device 100.

The reels 116 may be provided in video form with simulated reels being displayed via the display screen 104. A reel 116 may be used to display any number of symbols such as bells, hearts, fruits, numbers, letters, bars or other images and symbols, which could correspond to a theme associated with a game provided by the computational device 100. The computational device 100 may be configured to award prizes, awards, or other game play opportunities when the reels 116 stop spinning and a particular symbol combination is intersected by an active payline 120 (e.g., a payline 120 that is currently being wagered and is subject to evaluation for a win after the reels 116 have stopped spinning and a distribution of symbols is finalized).

FIG. 1B illustrates another example of a computational device 100 in accordance with at least some embodiments of the present disclosure. This particular example of computational device 100 may correspond to a portable computational device 100 such as a mobile smartphone, tablet, wearable, etc. The computational device 100 may be owned by a user of the device 100 rather than being owned by a casino operator. In other embodiments, the portable computational device 100 may be owned by a casino operator and provided to a player for an amount of time, possibly under an agreement between the casino operator and the player. As an example, the portable computational device 100 may be assigned to the player for a duration of their visit or stay at the casino, but the portable computational device 100 may be returned by the player back to the casino operator after the visit or stay has concluded.

The computational device 100 includes a display screen 104, a plurality of input devices 108, and at least one speaker 136. In some embodiments, the display screen 104 may correspond to a touch-sensitive display screen, meaning that the display screen 104 is simultaneously capable of displaying information (e.g., in connection with game play activity) and receiving a user input. In some embodiments, the touch-sensitive display screen 104 may provide game features similar to a cabinet-style computational device 100 without requiring all of the dedicated buttons provided by a cabinet-style computational device 100.

Figure 2:
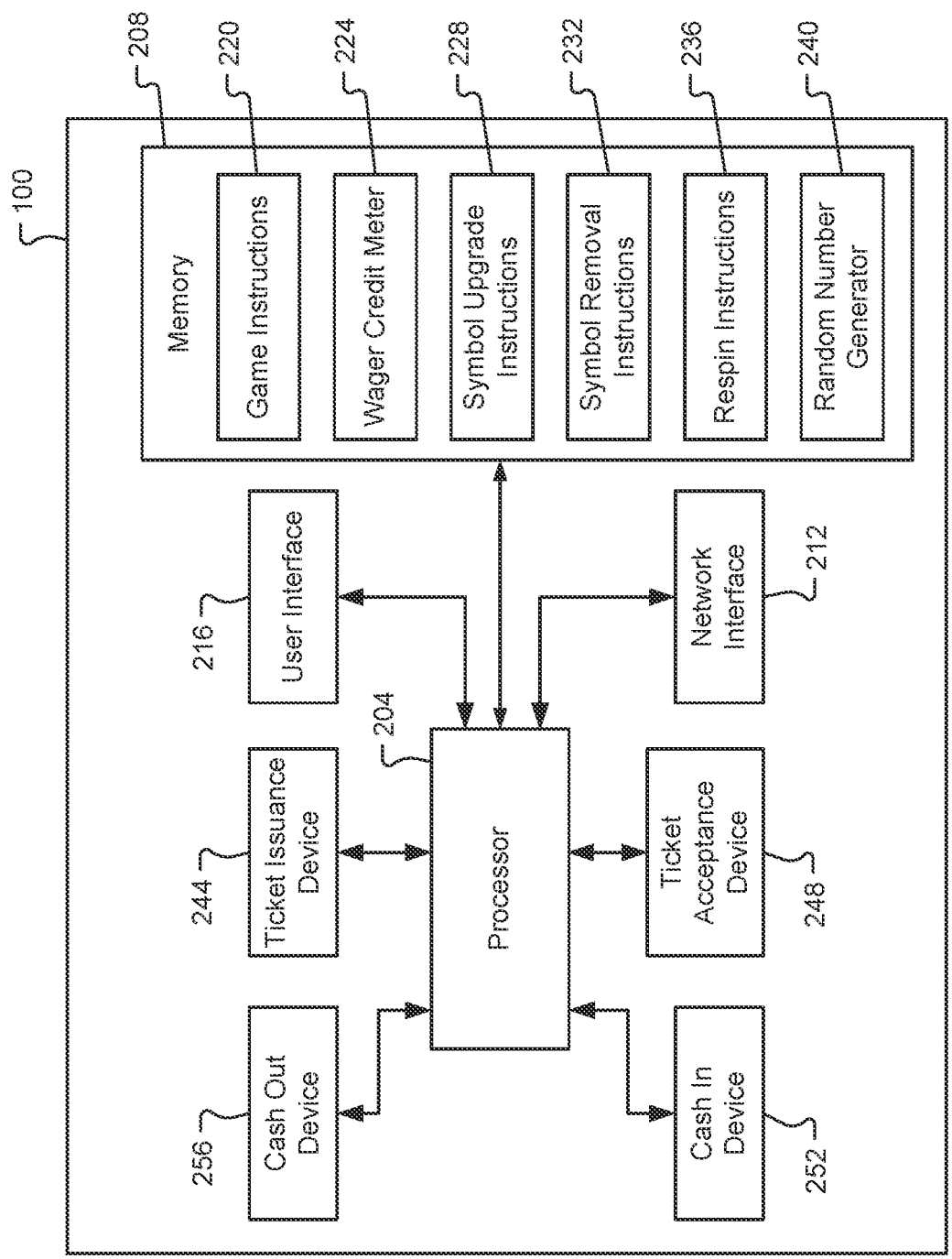
FIG. 2 is a block diagram depicting components of a computational gaming device for enabling enhanced gaming features and symbol upgrade operations.

With reference now to FIG. 2, additional details of the components that may be included in a computational device 100 will be described in accordance with at least some embodiments of the present disclosure. The computational device 100 is shown to include a processor 204, memory 208, a network interface 212, and a user interface 216. In some embodiments, the processor 204 may correspond to one or many microprocessors, Central Processing Units (CPUs), microcontrollers, Integrated Circuit (IC) chips, or the like. The processor 204 may be configured to execute one or more instruction sets stored in memory 208. In some embodiments, the instruction stored in memory 208, when executed by the processor 204, may enable the computational device 100 to provide game play functionality as described herein.

The nature of the network interface 212 may depend upon whether the network interface 212 is provided in cabinet-style computational device 100 or a mobile computational device 100. Examples of a suitable network interface 212 include, without limitation, an Ethernet port, a Universal Serial Bus (USB) port, an RS-232 port, an RS-485 port, a network interface controller (NIC), an antenna, a driver circuit, a modulator/demodulator, a Slot Machine Interface Board (SMIB), etc. The network interface 212 may include one or multiple different network interfaces depending upon whether the computational device 100 is connecting to a single communication network or multiple different types of communication networks. For instance, the computational device 100 may be provided with both a wired network interface 212 and a wireless network interface 212 without departing from the scope of the present disclosure.

The user interface 216 may include a combination of the user input and user outputs described in connection with FIGS. 1A and 1B. For instance, the user interface 216 may include the display screen 104, the input devices 108, the speakers 136, or any other component that is capable of enabling user interaction with the computational device 100. The user interface 216 may also include one or more drivers for the various hardware components that enable user interaction with the computational device 100.

The memory 208 may include one or multiple computer memory devices that are volatile or non-volatile. The memory 208 may be configured to store instructions that enable player interaction with the computational device 100 and that enable game play at the computational device 100. Examples of instructions that may be stored in the memory 208 include game instructions 220, symbol upgrade instructions 228, symbol removal instructions 232, and/or respin instructions 236. In addition to the instructions, the memory 208 may also be configured to store a random number generator 240 that is used by the game instructions 220, for example, to provide game outputs. The memory 220 may also be configured to store a wager credit meter 224 that is used to securely store wager history, available credit information, and other data related to wagers placed and game outcomes that occur at the computational device 100.

In some embodiments, the game instructions 220, when executed by the processor 204, may enable the computational device 100 to facilitate one or more games of chance or skill and produce interactions between the player and the game of chance or skill. In some embodiments, the game instructions 220 may include subroutines that present one or more graphics to the player via the user interface 216, subroutines that calculate whether a particular wager has resulted in a win or loss during the game of chance or skill, subroutines for determining payouts for the player in the event of a win, subroutines for exchanging communications with another device, such as a server, etc. The game instructions 220 may also be configured to call certain other instructions stored in memory 208 for purposes of enhancing gameplay features for a player. As an example, the game instructions 220 may be configured to automatically call symbol upgrade instructions 228, symbol removal instructions 232, and/or respin instructions 236 based on a layout of symbols within an array of cells. For example, the game instructions 220 may be configured to automatically call the symbol upgrade instructions 228 and/or symbol removal instructions 232 in response to evaluating a distribution of symbols and determining that at least two adjacent cells include a common symbol.

When called by the game instructions 220, the processor 204 may then automatically begin executing the symbol upgrade instructions 228 and/or symbol removal instructions 232 to upgrade a cell, remove one or more symbols from a cell, and the like. In a non-limiting example, the symbol upgrade instructions 228 and symbol removal instructions 232 may be automatically executed by the processor 204 prior to processing respin instructions 236 that allow a player to implement a respin opportunity. While depicted as separate instructions, it should be appreciated that the respin instructions 236 may be included as part of the game instructions 220. When executed by the processor 204, the respin instructions 236 may invoke a respin operation in which some or all of the cells in the array of cells are subject to a respin (e.g., subject to having a new discrete symbols placed therein). In some embodiments, a cell that has been upgraded to include an upgrade symbol or the like may not be subject to a respin whereas all other cells in the array of cells may still be subject to the respin. In this example, the cell that is upgraded by the symbol upgrade instructions 228 may retain an upgrade symbol after the respin such that a distribution of symbols after the respin still includes the upgrade symbol in the cell that was upgraded prior to the respin.

In some embodiments, the game instructions 220 may be configured to initiate a reel spin at the various reels 116 in connection with game play. In some embodiments, the random number generator 240 may be used to determine a final position of the reels 116 after the spin is completed. Alternatively or additionally, the game instructions 220 and/or respin instructions 236 may utilize an output from the random number generator 240 to determine a distribution of symbols in the array of cells. The game instructions 220 may also be configured to present symbols via the display screen 104 when the reels 116 correspond to video reels or the like. The game instructions 220 may also be configured to evaluate a position of symbols relative to one or more paylines 120, relative to predetermined symbol areas, or cells in an array of cells, and any other evaluation desired to facilitate game play.

The credit meter 224 may be used to store or log information related to various player activities and events that occur at the computational device 100. The types of information that may be maintained in the credit meter 224 include, without limitation, player identification information, available credit information, wager amount information, game outcomes, and other types of information that may or may not need to be recorded for purposes of accounting for wagers placed at the computational device 100 and payouts made for a player during a game of chance or skill played at the computational device 100.

In some embodiments, the credit meter 224 may be configured to track coin in activity, coin out activity, coin drop activity, jackpot paid activity, credits applied activity, external bonus payout activity, voucher in activity, voucher out activity, timing of events that occur at the computational device 100, and the like. In some embodiments, certain portions of the credit meter 224 may be updated in response to outcomes of a game of chance or skill played at the computational device 100.

While shown as separate instructions, it should be appreciated that the symbol upgrade instructions 228, symbol removal instructions 232, and/or respin instructions 236 may correspond to a subroutine of the game instructions 220 without departing from the scope of the present disclosure. Additional details and functional capabilities of the symbol upgrade instructions 228, symbol removal instructions 232, and/or respin instructions 236 working in cooperation with the game instructions 220 will be described in connection with FIGS. 3-9.

The computational device 100 is further shown to include a ticket issuance device 244, a ticket acceptance device 248, a cash in device 252, and a cash out device 256. The ticket issuance device 244 may be configured to receive physical tickets, vouchers, or player loyalty cards. In some embodiments, the ticket issuance device 244 and ticket acceptance device 248 may operate in concert with the ticket acceptor 128. In such an embodiment, the ticket acceptor 128 may correspond to the physical components that receive and issue a ticket or voucher whereas the ticket issuance device 244 and the ticket acceptance device 248 correspond to the drivers and/or firmware components that control operation of the ticket acceptor 128. It should also be appreciated that the card reader 132 may be in communication with the ticket issuance device 244 and the ticket acceptance device 248 and may have functionality driven by one or both of these devices. For instance, the card reader 132 may correspond to the physical hardware components that receive information from a player loyalty card (or player loyalty application running on a mobile communication device, etc.) and that information may be processed by the ticket acceptance device 248 when receiving player credits from cards read by the card reader 132. The ticket issuance device 244 may provide the card reader 132 with information for applying wager credits back to a player card when a player is done with a game play session and wishes to transfer credits from the credit meter 224 back onto their card. Thus, the ticket issuance device 244 and ticket acceptance device 248 may also operate as a driver and/or firmware component for the card reader 132.

Similarly, the cash in device 252 and cash out device 256 may include or operate in concert with the coin slot 124 and any coin delivery mechanisms. The cash in device 252 and cash out device 256 may include hardware, drivers, or firmware that facilitate receiving or distributing cash, tokens, bills, etc. In some embodiments, the cash in device 252 may be configured to determine an amount of cash (e.g., in coins, bills, etc.), an amount or number of tokens, etc., input at the coin slot 124 and convert the values into credits for playing games with the game instructions 220. The cash out device 256 may correspond to hardware and software configured to output coins, tokens, bills, etc. if a player decides to cash out or convert playing credits back into cash, tokens, bills, etc.

Figure 3:
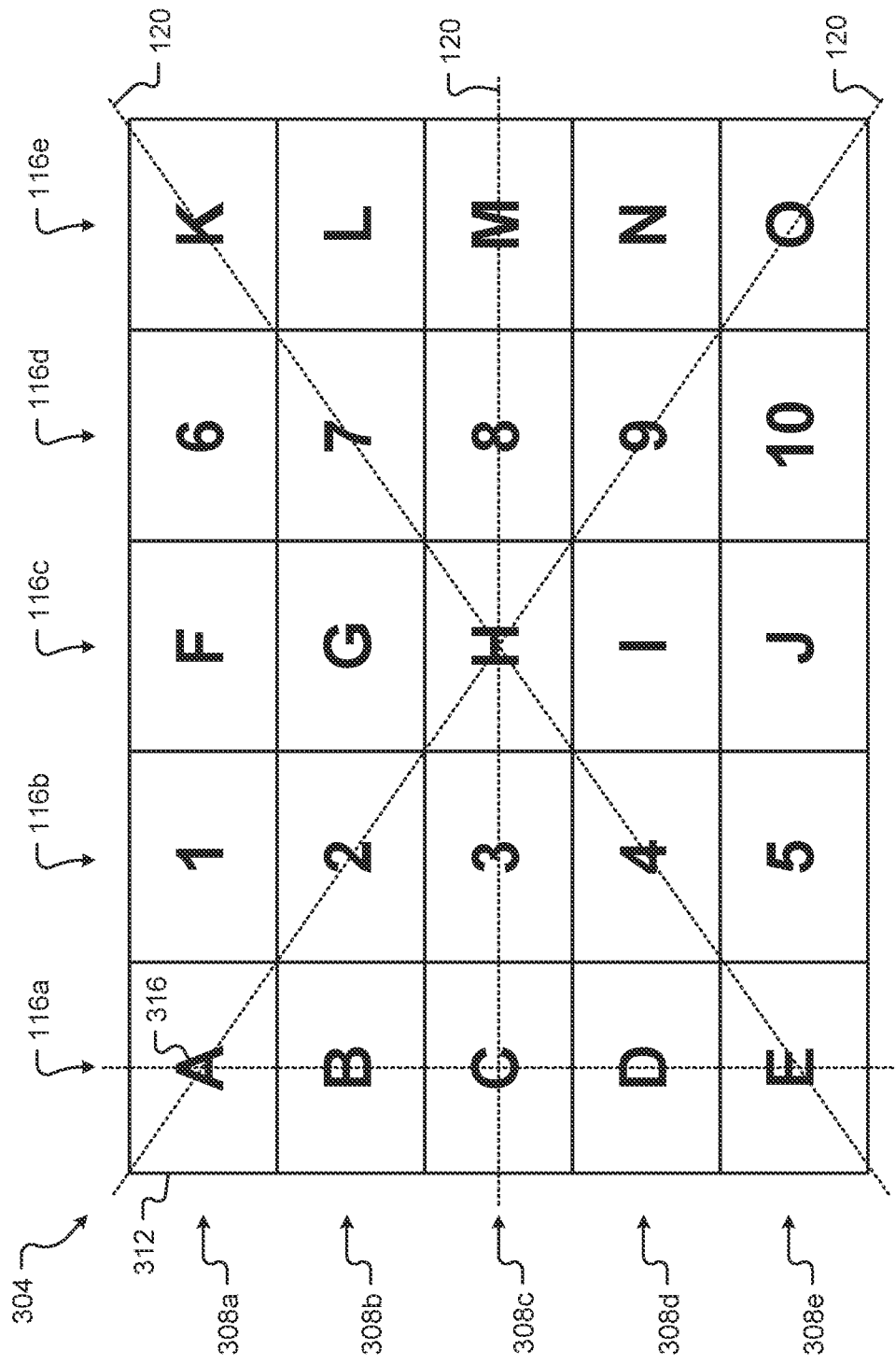
FIG. 3 is an illustrative layout of symbols rendered to an array of cells of a game.

With reference now to FIGS. 3 to 7C, various operations of the game instructions 220, the symbol upgrade instructions 228, the symbol removal instructions 232, and/or the respin instructions 236 will be described in accordance with at least some embodiments of the present disclosure. Referring initially to FIG. 3, a first distribution of symbols 316 rendered to an array of cells 304 of a game will be described in accordance with embodiments of the present disclosure. The array of cells 304 may be presented, or otherwise rendered, with the display screen 104. In some embodiments, the game instructions 220 may control which particular symbols 316 are presented within a particular cell 312 in the array of cells 304. The illustrative array of cells 304 is shown to include five columns 116a, 116b, 116c, 116d, 116e of cells 312 and five rows 308a, 308b, 308c, 308d, 308e of cells 312. Although FIG. 3 illustrates a 5x5 array of cells 304, it should be appreciated that embodiments of the present disclosure can be implemented in an array of cells 304 having a variety of sizes. For instance, embodiments of the present disclosure may be used in an array of cells 304 that are 3×3, 3×5, 5×3, 7×3, 10×5, 10×10, etc. The example layout of the array of cells 304 should not be construed as limiting embodiments of the present disclosure.

As can be seen in FIG. 3, each cell 312 in the array of cells 304 may be populated with a single symbol 316. In other words, after the game instructions 220 has applied a random number generator 232 to determine symbol 316 placement throughout the array of cells 304, there may be a 1:1 correlation of symbols 316 to cells 312. Each column 116a, 116b, 116c, 116d, 116e may also be referred to as a reel 116, particularly in the event that the game instructions 220 provides a slot game. If a slot game is implemented, then the reels 116 (e.g., in video form) are spun (e.g., virtually) and their final position after the spin is determined, at least in part, based on the output of the random number generator 232. In some embodiments, a symbol 316 may correspond to an absence of a symbol or a blank symbol. This blank symbol may correspond to a symbol in a cell 312 having no value.

In some embodiments, payouts or other predetermined game outcomes (e.g., bonus spin opportunities, prize wins, cash wins, re-spin bonus plays, etc.) may be determined based on a symbol combination that falls on a payline 120 that is subject to a wager prior to the spin. In some embodiments, a plurality of the paylines 120 may be selected for "play" prior to a spin, meaning that any payline 120 selected for "play" will be evaluated for a predetermined symbol combination, or sequence of symbols 316. Examples of a sequence of symbols 316 may include, but are in no way limited to, at least one of the sequence [A; 1; F; 6; K] associated with the first row 308a, the sequence [B; 2; G; 7; L] associated with the second row 308b, the sequence [C; 3; H; 8; M] associated with the third row 308c, the sequence [D; 4; I; 9; N] associated with the fourth row 308d, the sequence [E; 5; J; 10; 0] associated with the fifth row 308e, and/or reverse sequences of the same. Additionally or alternatively, the sequence of symbols 316 may include, but are in no way limited to, a sequence of symbols 316 in an order along one or more of the vertical lines of cells 312 associated with the columns 116a-116e (e.g., the sequence [A; B; C; D; E], the sequence [1; 2; 3; 4; 5], etc., and/or reverse sequences of the same). In some embodiments, the sequence of symbols 316 may include, but are in no way limited to, a sequence of symbols 316 in an order along one or more of the cells 312 having a payline 120 running therethrough (e.g., the first diagonal payline sequence [A; 2; H; 9; O], the second diagonal payline sequence [E; 4; H; 7; K], the first vertical payline sequence [A; B; C; D; E], the first horizontal payline sequence [C; 3; H; 8; M], etc., and/or reverse sequences of the same). In one embodiment, the sequence of symbols may comprise all sequences of symbols associated with each row 308a-308e and/or column 116a-116e. A selected payline 120 may also correspond to the payline 120 that is evaluated after a respin, but was wagered prior to the respin. In some embodiments, however, it may be possible to switch or select more paylines 120 for evaluation after a spin has completed, but before a subsequent play operation (e.g., respin, etc.) has been performed. The addition of more paylines 120 after the original spin but prior to the subsequent play operation may require the user to provide more credits to the game instructions 220 as part of enabling evaluation over more paylines 120. Although shown having four different linear paylines 120 (e.g., horizontal, vertical, diagonal, etc.), one or more paylines 120 may be associated with cells 312 in any shape the array of cells 304. In one embodiment, a payline 120 may run through a single row 308a-308e of the array of cells 304 (e.g., first row 308a, etc.). In some embodiments, a payline 120 may run through one or more columns 116a-116e in the array of cells 304. In any event, embodiments of the present disclosure are not limited to the position and/or shape of the paylines 120 shown in FIGS. 3-5B.

Figure 4A:
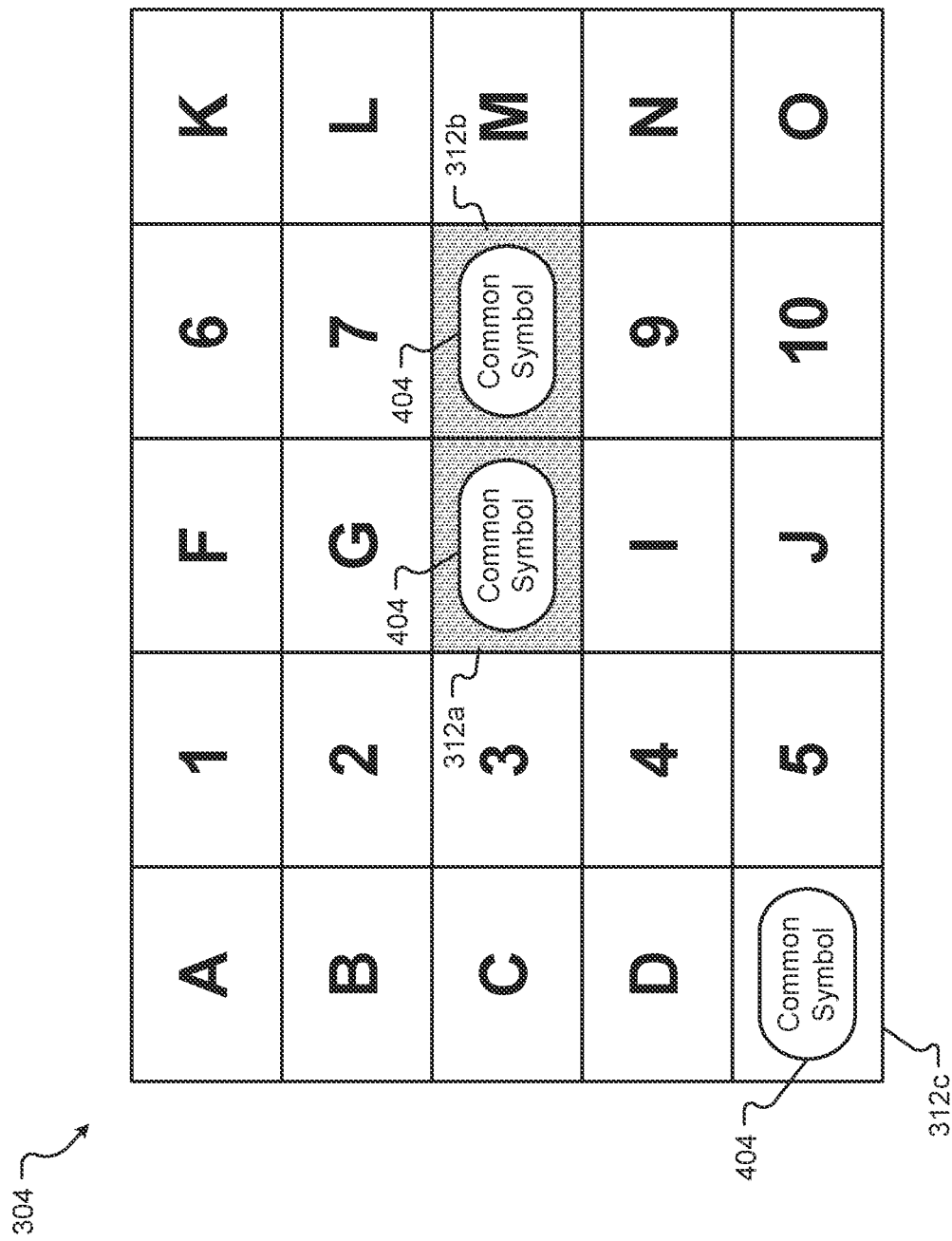
FIG. 4A illustrates one example of a first distribution of symbols in an array of cells where at least two adjacent cells include a common symbol therein.
Figure 4B:
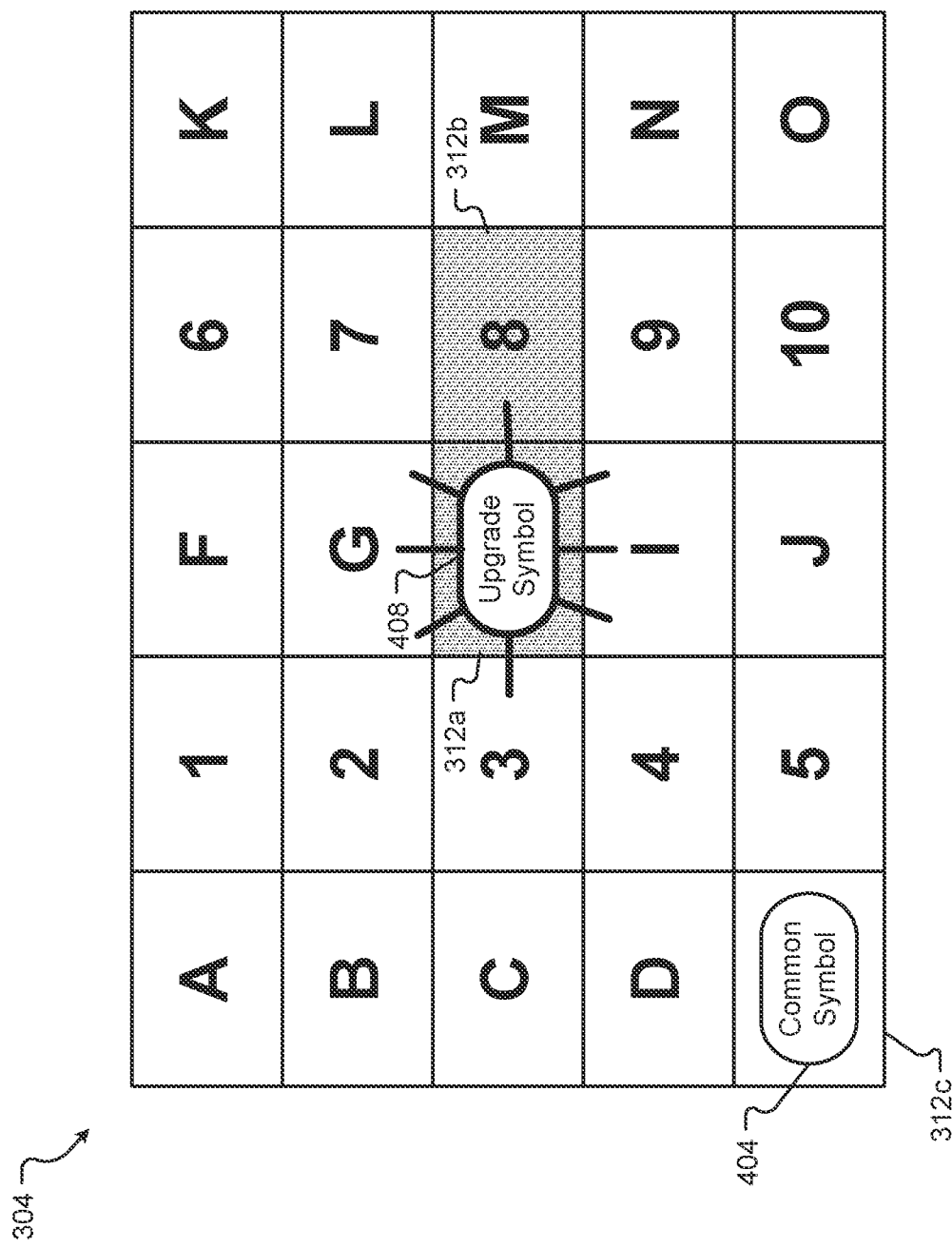
FIG. 4B illustrates a transition from the first distribution of symbols shown in FIG. 4A where an automated symbol upgrade operation has been performed in response to determining that at least two adjacent cells include a common symbol therein.
Figure 4C:
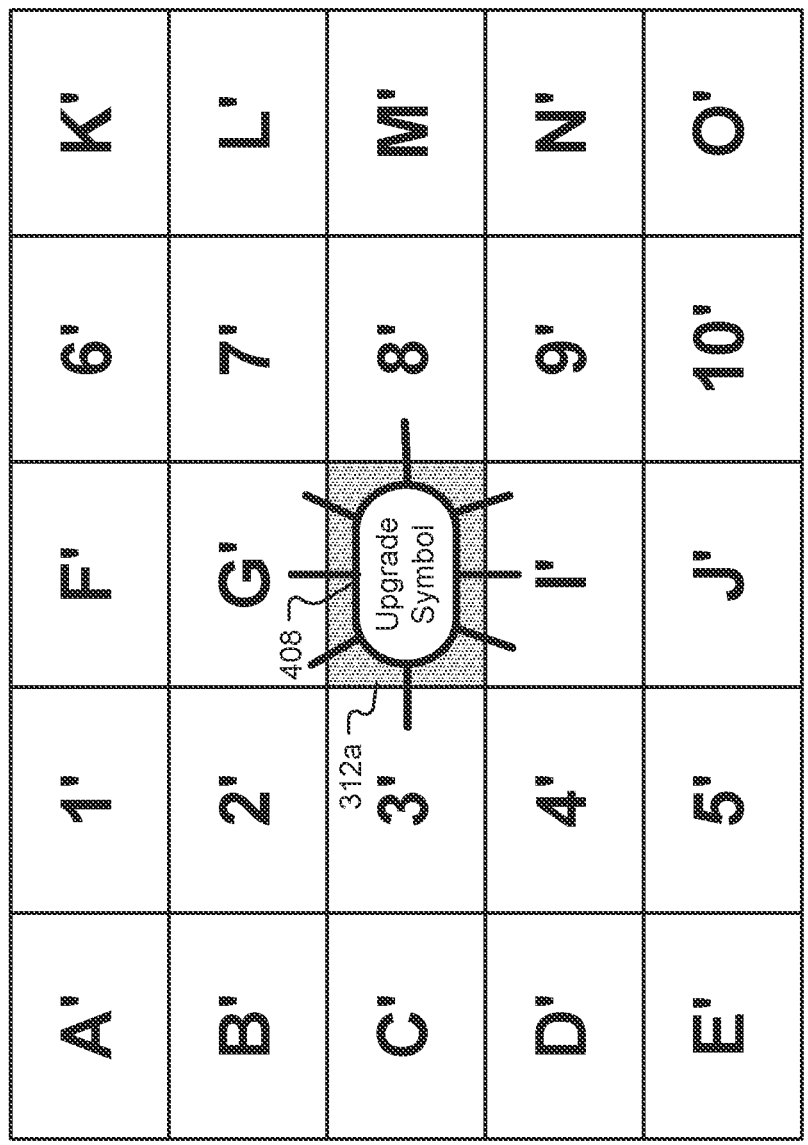
FIG. 4C illustrates a second distribution of symbols after the symbol upgrade operation shown in FIG. 4B is performed and after a respin feature has been invoked.

Referring now to FIGS. 4A-4C, a first illustrative game play sequence that can be performed by the processor 204 in response to executing the game instructions 220, the symbol upgrade instructions 228, the symbol removal instructions 232, and/or the respin instructions 236 will be described in accordance with at least some embodiments of the present disclosure. In some embodiments, FIGS. 4A-4C illustrate various presentations that are caused to be rendered by a display screen 104 of a computational device 100.

As shown in FIG. 4A, a first distribution of symbols 316 in the array of cells 304 may result in at least some of the cells 312 being populated by a common symbol 404. In some embodiments, the first distribution of symbols 316 may be determined by the game instructions 220 and based, at least in part, on an output of the random number generator 240.

FIG. 4A further illustrates that some cells 312 having the common symbol 404 may be adjacent to one another whereas other cells 312 having the common symbol 404 may not necessarily be adjacent to another cell 312 having the common symbol 404. In the illustrated example, a first cell 312a, second cell 312b, and third cell 312c are shown to include the common symbol 404 in the first distribution of symbols.

The game instructions 220 may evaluate the first distribution of symbols and determine that the first cell 312a and second cell 312b are adjacent to one another and include the common symbol 404. Upon determining that the adjacent first cell 312a and second cell 312b both include the common symbol 404, the game instructions 220 may call the symbol upgrade instructions 228 and/or symbol removal instructions 232 to implement an automated symbol upgrade and/or symbol removal operation prior to invoking the respin instructions 236.

While the example of FIG. 4A shows the first cell 312a and second cell 312b as being laterally adjacent to one another, it should be appreciated that two or more cells having any particular relative position to one another may be considered adjacent. For instance, the first cell 312a and second cell 312b may be considered adjacent if the two cells are vertically adjacent to one another, diagonally adjacent to one another, or satisfy any other predetermined relative position. For example, the cell 312 located at the first row 308a, second column 116b may be considered adjacent to a cell 312 located anywhere within the first row 308a, anywhere within the second column 116, or the like. Alternatively or additionally, the cell 312 located at the first row 308a, second column 116 may be considered adjacent to a cell 312 located at the second row 308b, first column 116 and/or a cell 312 located at the second row 308b, third column 116c.

In addition to evaluating the adjacency of cells, the game instructions 220 may also be configured to evaluate which, if any, cells 312 include a common symbol 404. As discussed above, symbols 316 may be provided in any number of possible forms. Non-limiting examples of symbols 316 that may correspond to a common symbol 404 include bells, hearts, fruits, numbers, letters, bars, etc. For instance, the common symbol 404 may correspond to a number (e.g., "50", "100", etc.) that is displayed within a particular cell 312.

Upon determining that the first cell 312a and the second cell 312b both include the common symbol 404 and are adjacent to one another, the game instructions 220 may call the symbol upgrade instructions 228 and/or symbol removal instructions 232 to invoke an automated symbol upgrade and/or removal operation. Specifically, as shown in FIG. 4B, a cell 312 in the array of cells 304 may be automatically upgraded by the symbol upgrade instructions 228 to include an upgrade symbol 408. The upgrade symbol 408 may represent that the common symbol 404 in the first cell 312a and the second cell 312b have been combined. The upgrade symbol 404 may be retained in the first cell 312a during a respin operation. In the meantime, the second cell 312b may not necessarily be upgraded to include the upgrade symbol 408. In this situation, the symbol removal instructions 232 may remove the common symbol 404 from the second cell 312b simultaneous with, before, or after the upgrade symbol 408 has been placed into the first cell 312a. Upon having the common symbol 404 removed from the second cell 312b, the symbol removal instructions 232 may cause a different symbol (e.g., "8") to be presented in the second cell 312b. Alternatively or additionally, the symbol removal instructions 232 may cause the second cell 312*b* to have no symbol 316 presented therein at least until a respin operation is performed.

FIG. 4C illustrates a second distribution of symbols 316 that may be presented after the respin instructions 236 have been invoked. In this example, the first cell 312*a* is still shown to include the upgrade symbol 408, even after the respin operation has been performed. Thus, the symbol upgrade instructions 228 may have informed the respin instructions which cell(s) 312 were subject to a respin and which cell(s) 312 were not subject to a respin. In the second distribution of symbols 316 shown in FIG. 4C, the upgrade symbol 408 was retained in the first cell 312*a* (e.g., the cell 312 subject to the upgrade process) while all cells 312 other than the first cell 312*a* were subject to the respin. Each cell 312 other than the first cell 312*a* may have a new discrete symbol 316 assigned thereto. It could be possible that a cell 312 receives the same symbol from one distribution to the next, but the symbol 316 distribution may still be determined based on the output of the random number generator 240. For instance, FIG. 4C illustrates the second cell 312*b* as containing the symbol "8'" in the second distribution of symbols. It may be possible, however, that the second cell 312*b* receives the common symbol 404 again, after the respin.

The second distribution of symbols 316 may be automatically initiated by the game instructions 220 and/or respin instructions 236. Alternatively, some form of player input may be required to initiate a second play of the game, which results in the second distribution of symbols 316.

Figure 5A:
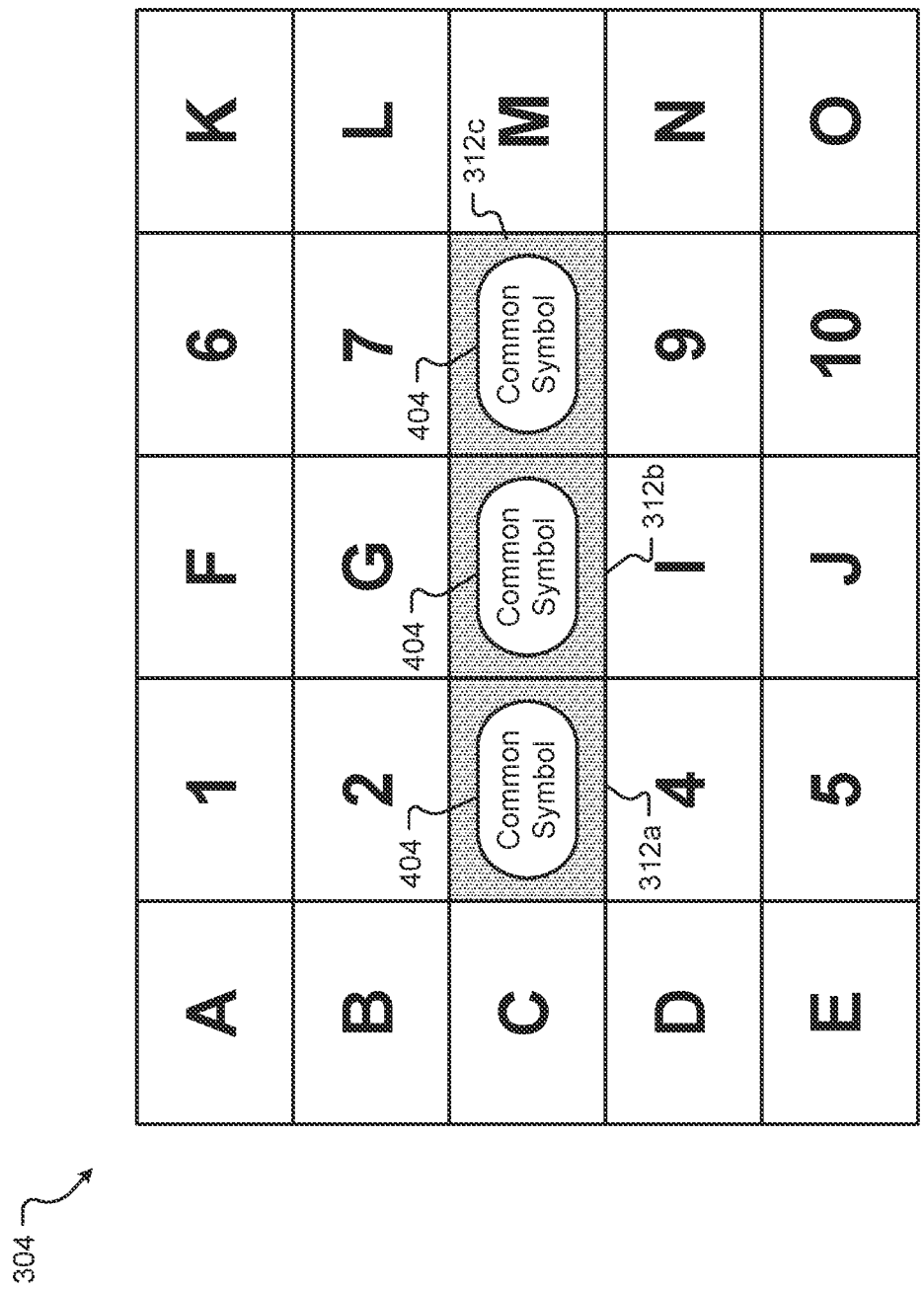
FIG. 5A illustrates another example of a first distribution of symbols in an array of cells where two or more adjacent cells include a common symbol therein.
Figure 5B:
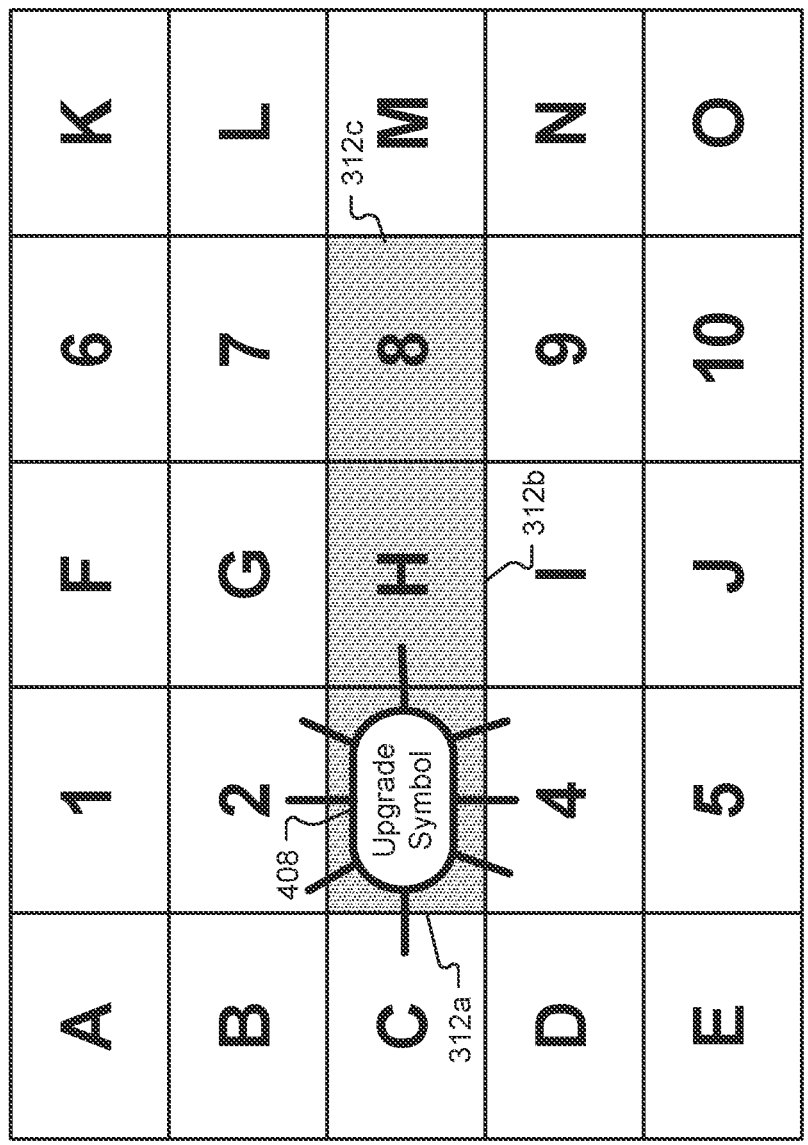
FIG. 5B illustrates a transition from the first distribution of symbols shown in FIG. 5A where an automated symbol upgrade operation has been performed in response to determining that two or more adjacent cells include a common symbol therein.
Figure 5C:
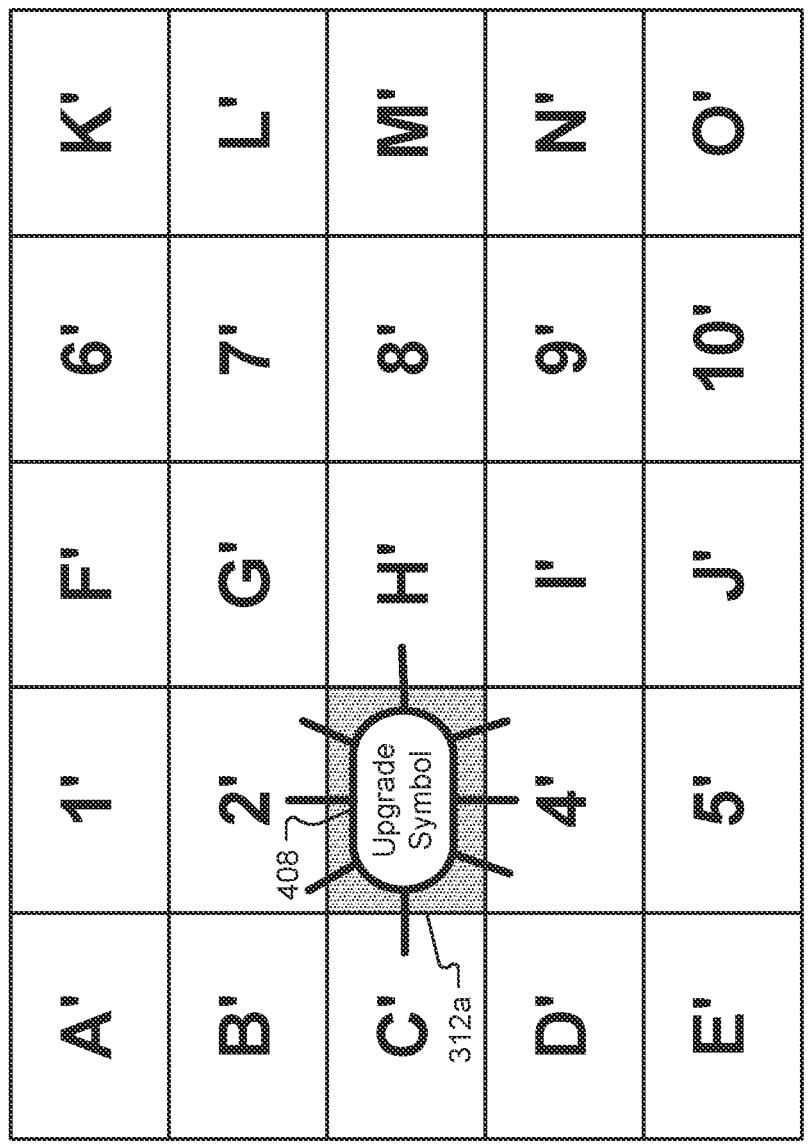
FIG. 5C illustrates a second distribution of symbols after the symbol upgrade operation shown in FIG. 5B is performed and after a respin feature has been invoked.

Referring now to FIGS. 5A-5C, a second illustrative game play sequence that can be performed by the processor 204 in response to executing the game instructions 220, the symbol upgrade instructions 228, the symbol removal instructions 232, and/or the respin instructions 236 will be described in accordance with at least some embodiments of the present disclosure.

FIG. 5A shown a first distribution of symbols 316 that is different from the first distribution of symbols 316 shown in FIG. 4A. Specifically, now the first distribution of symbols 316 is shown to include three adjacent cells 312 with the common symbol 404. Again, the common symbol 404 may correspond to any suitable symbol available for use by the game instructions 220. Here the first cell 312*a*, the second cell 312*b*, and the third cell 312*c* are each shown to include the common symbol 404 and all three cells are shown to be adjacent to one another.

The game instructions 220 may evaluate the first distribution of symbols 316 and determine that three adjacent cells 312 include the common symbol 404. This determination may cause the game instructions 220 to invoke the symbol upgrade instructions 228 and/or symbol removal instructions 232 prior to invoking the respin instructions 236. The symbol upgrade instructions 228 and/or symbol removal instructions 232 may cause a cell 312 to be upgraded to include an upgrade symbol 408 as shown in FIG. 5B.

In the example of FIG. 5B, the upgraded cell 312 corresponds to the first cell 312*a*. It should be appreciated that the symbol upgrade instructions 228 do not necessarily need to upgrade the first cell 312*a* with the upgrade symbol 408. As an example, the symbol upgrade instructions 228 may select the second cell 312*b* and/or third cell 312*c* to become the upgraded cell 312 (e.g., the cell 312 designated to receive the upgrade symbol 408). Alternatively or additionally, the symbol upgrade instructions 228 could select a cell 312 other than the first cell 312*a*, second cell 312*b*, and third cell 312*c* to become the upgraded cell 312. As an example, the cell 312 at the second row 308*b*, second column 116*b* could be selected to become the upgraded cell 312 and receive the upgrade symbol 408. At this point, the non-upgraded cells 312 (which may include some or all of the first cell 312*a*, second cell 312*b*, and third cell 312*c*) may be subject to a respin operation and receiving a new symbol 316.

FIG. 5C illustrates a second distribution of symbols 316 after respin and after the first cell 312*a* has been upgraded to include the upgrade symbol 408. In some embodiments, the upgrade symbol 408 represents that the common symbol 404 in the first cell 312*a*, second cell 312*b*, and third cell 312*c* were combined. In an example where the common symbol 404 corresponds to a number, the upgrade symbol 408 may correspond to a number of cells 312 involved in the upgrade (e.g., three in the example of FIGS. 5A-5C) times a value of the number. Illustratively, if the common symbol 404 corresponds to a number of "100", then the upgrade symbol 408 in FIGS. 5B and 5C could correspond to a number of "300." In another example where the common symbol 404 corresponds to an icon or graphic, such as a cherry, the upgrade symbol 408 may correspond to a multiple of the icon or graphic (e.g., triple cherries). In another example, the upgrade symbol 408 does not necessarily need to correspond to a summation of all common symbols 404 involved in the upgrade, but the upgrade symbol 408 could still correspond to a symbol 316 having a higher value than the common symbol 404. Again considering the example of the common symbol 404 corresponding to a number of "100", the upgrade symbol 408 could correspond to a number having a value greater than "100" (e.g., "150", "200", "500", "1000", etc.). In some examples, a value associated with the upgrade symbol 408 may be determined by applying a multiplier to a value associated with the common symbol 404, but the multiplier can be a number greater than one and possibly greater than the number of cells 312 involved in the upgrade operation.

Figure 6A:
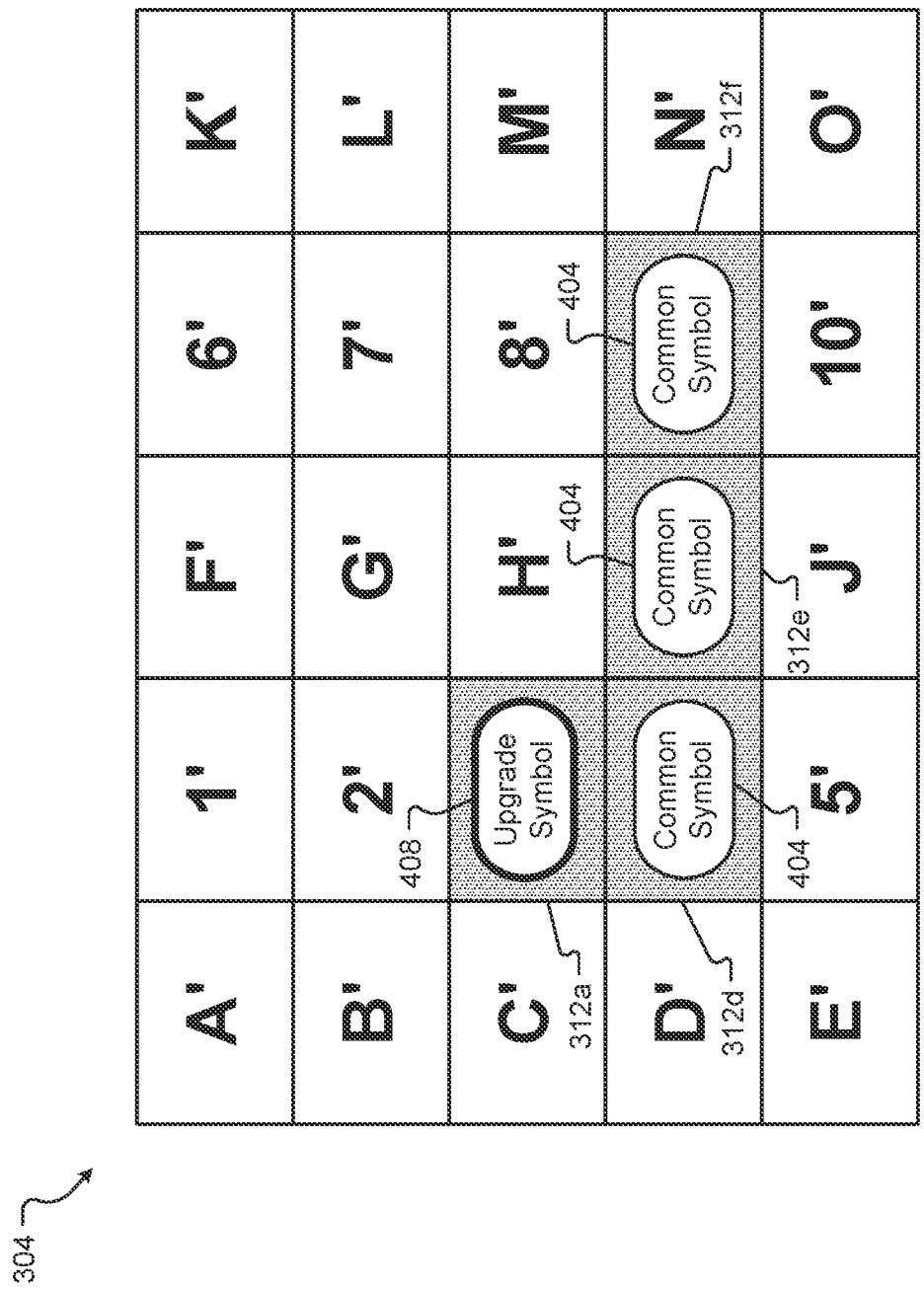
FIG. 6A illustrates another example of a distribution of symbols in an array of cells where two or more adjacent cells include a common symbol therein and where another cell also includes an upgrade symbol.
Figure 6C:
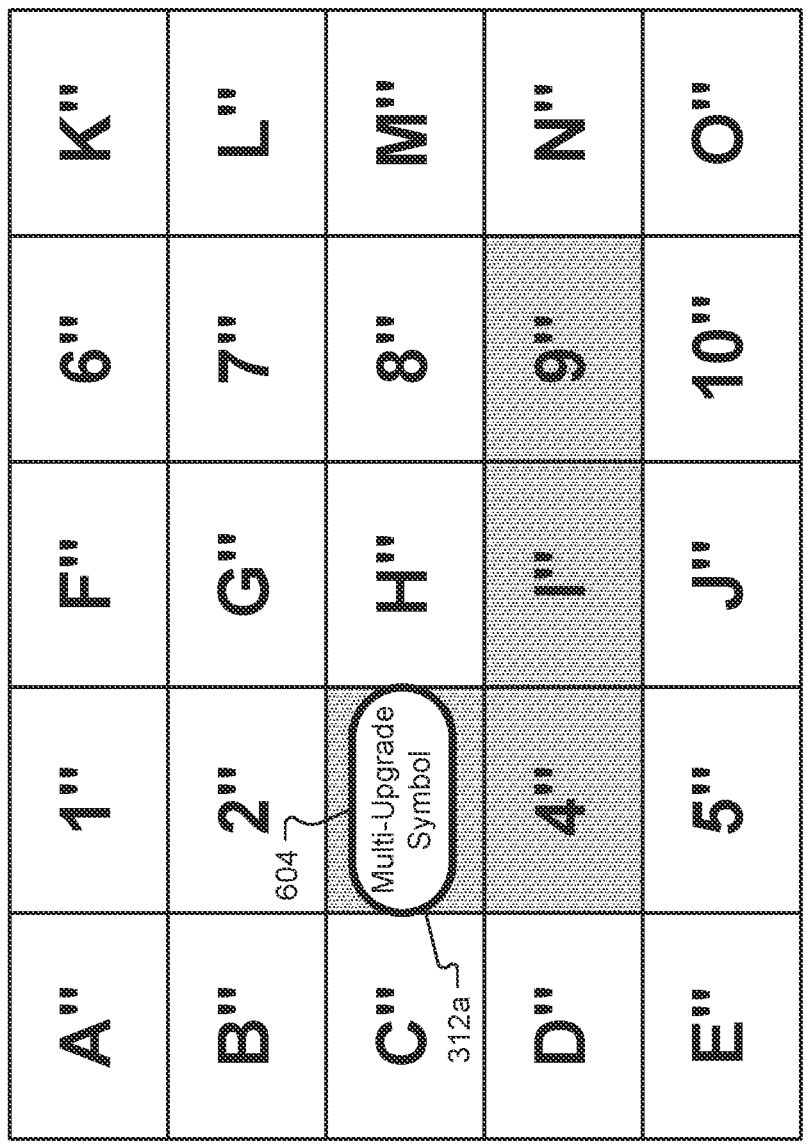
FIG. 6C illustrates another transition from the distribution of symbols shown in FIG. 6B where two upgrade symbols are further upgraded to a multi-upgrade symbol.

Referring now to FIGS. 6A-6C, a third illustrative game play sequence that can be performed by the processor 204 in response to executing the game instructions 220, the symbol upgrade instructions 228, the symbol removal instructions 232, and/or the respin instructions 236 will be described in accordance with at least some embodiments of the present disclosure.

FIG. 6A illustrates a distribution of symbols 316, which may correspond to a distribution before or after a respin. In this particular example, the distribution of symbols 316 is shown to correspond to a distribution after a first respin, but before a second respin. Here, a first cell 312*a* is already shown to have the upgrade symbol 408 whereas other cells (e.g., a fourth cell 312*d*, a fifth cell 312*e*, and a sixth cell 312*f*) include the common symbol 404. As an example, the upgrade symbol 408 may have been placed into the first cell 312*a* following a symbol upgrade operation like the ones described in connection with FIGS. 4A-4C and/or FIGS. 5A-5C. Alternatively, the upgrade symbol 408 may have been placed into the first cell 312*a* by the game instructions 220.

The other cells containing the common symbol 404 may now be subject to a symbol upgrade process based on the processor 204 executing the symbol upgrade instructions 228. Moreover, the symbol upgrade instructions 228 may be configured to select a cell to be upgraded based on the position of the upgrade symbol 408 already in the first cell 312*a*. By determining the fourth cell 312*d* is adjacent to the first cell 312*a*, the symbol upgrade instructions 228 may select the fourth cell 312*d* to be upgraded based on its adjacency to the first cell 312a, which may provide the opportunity to further upgrade the upgrade symbols 408 as will be described herein.

Specifically, as shown in FIG. 6B, when the fourth cell 312d is upgraded to include the upgrade symbol 408, there are now two adjacent cells that include common symbols in the form of the upgrade symbol 408. At this point, the symbol upgrade instructions 228 may perform a subsequent upgrade process that selects another cell for a further upgrade. Again, the symbol upgrade instructions 228 may select the first cell 312a, the fourth cell 312d, or some other cell as the cell 312 to be upgraded.

FIG. 6C illustrates the first cell 312a being selected as the cell 312 to be upgraded based on the adjacency of the upgrade symbols 408. The symbol upgrade instructions 228 may then update and upgrade the first cell 312a to include a multi-upgrade symbol 604 and the cells 312 previously having the common symbol 404 and/or upgrade symbol 408 may have their symbols removed and may be subject to a respin operation. The multi-upgrade symbol 604 may include an increased value relative to the upgrade symbol 408. Illustratively, the multi-upgrade symbol 604 may represent that the upgrade symbols 408 have been combined into the multi-upgrade symbol 604.

While the transition from FIGS. 6B to 6C is illustrated as providing a multi-upgrade symbol 604 across multiple spins, it should be appreciated that embodiments of the present disclosure also contemplate multi-upgrades within the same spin. For example, after a single spin, a first set of symbols 316 may be upgraded to an upgrade symbol 408 and then that upgrade symbol 408 may be combined with another upgrade symbol 408 to create a multi-upgrade symbol 604. The multiple upgrades may be performed without requiring a second spin. More specifically, multiple upgrades may be performed within the same spin based on an optimized placement of the initial upgrade symbol 408. As an example, two or more symbols 316 may be optimally combined into an upgrade symbol 408 to have the upgrade symbol 408 land adjacent to another upgrade symbol 408, thereby resulting in the two upgrade symbols 408 automatically combining into the multi-upgrade symbol 604. In other words, the cell 312 that receives the upgrade symbol 408 may be selected based on proximity to another symbol 316 that will provide an opportunity for a multi-upgrade symbol 604.

Figure 7A:
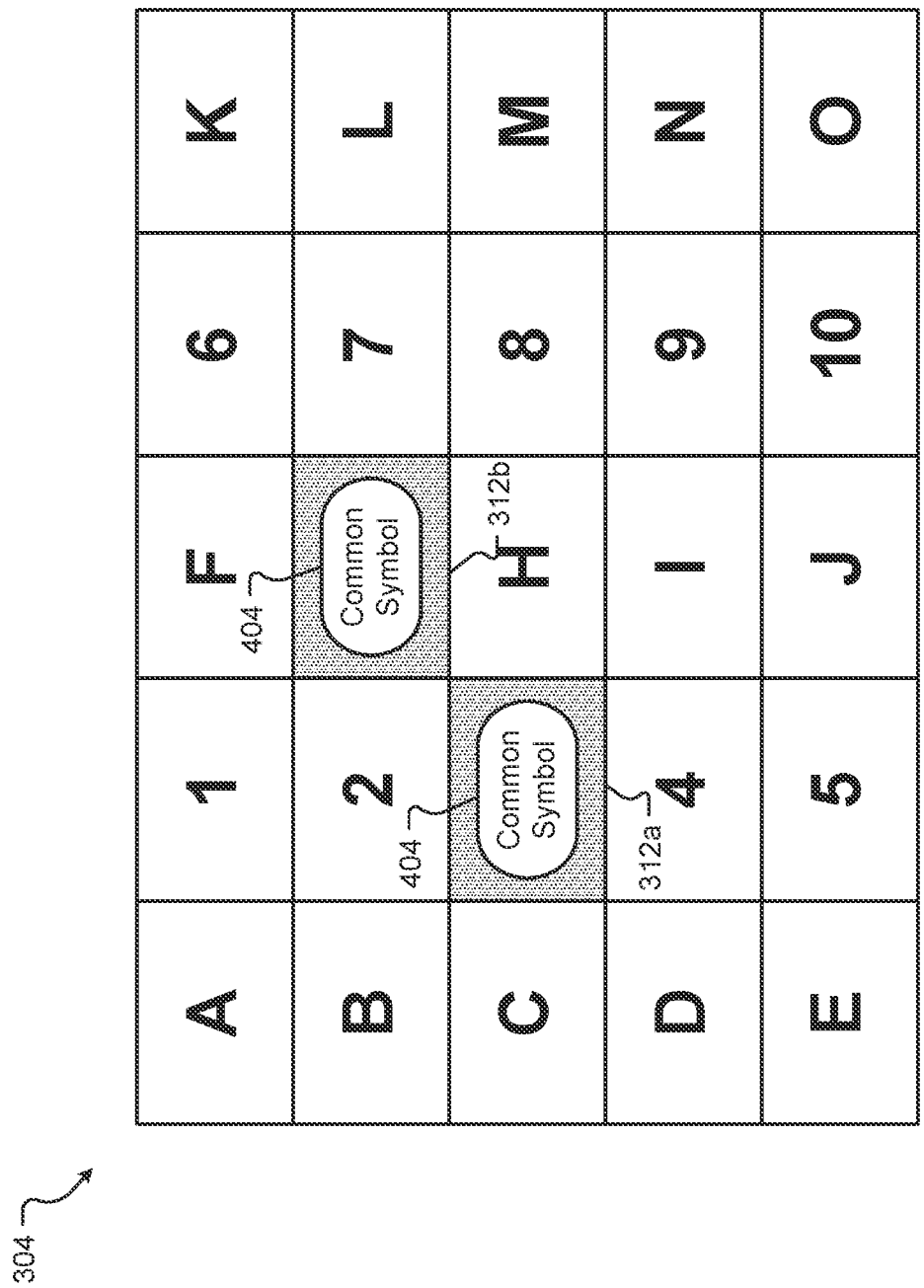
FIG. 7A illustrates another example of a first distribution of symbols in an array of cells where two or more adjacent cells include a common symbol therein.
Figure 7B:
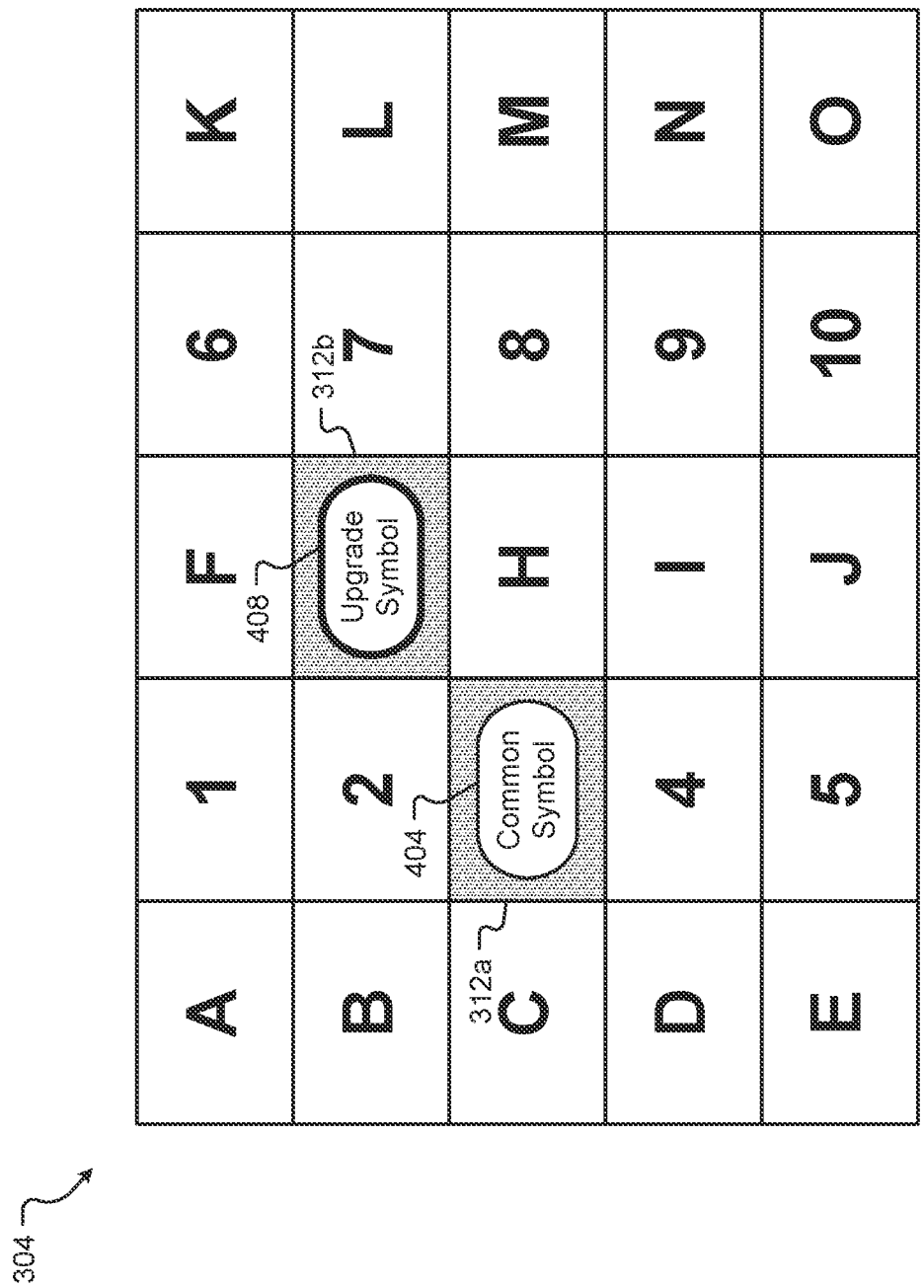
FIG. 7B illustrates a transition from the first distribution of symbols shown in FIG. 7A where an automated symbol upgrade operation has been performed in response to determining that two or more adjacent cells include a common symbol therein and where a non-upgraded cell still retains the common symbol after the symbol upgrade operation has been performed.
Figure 7C:
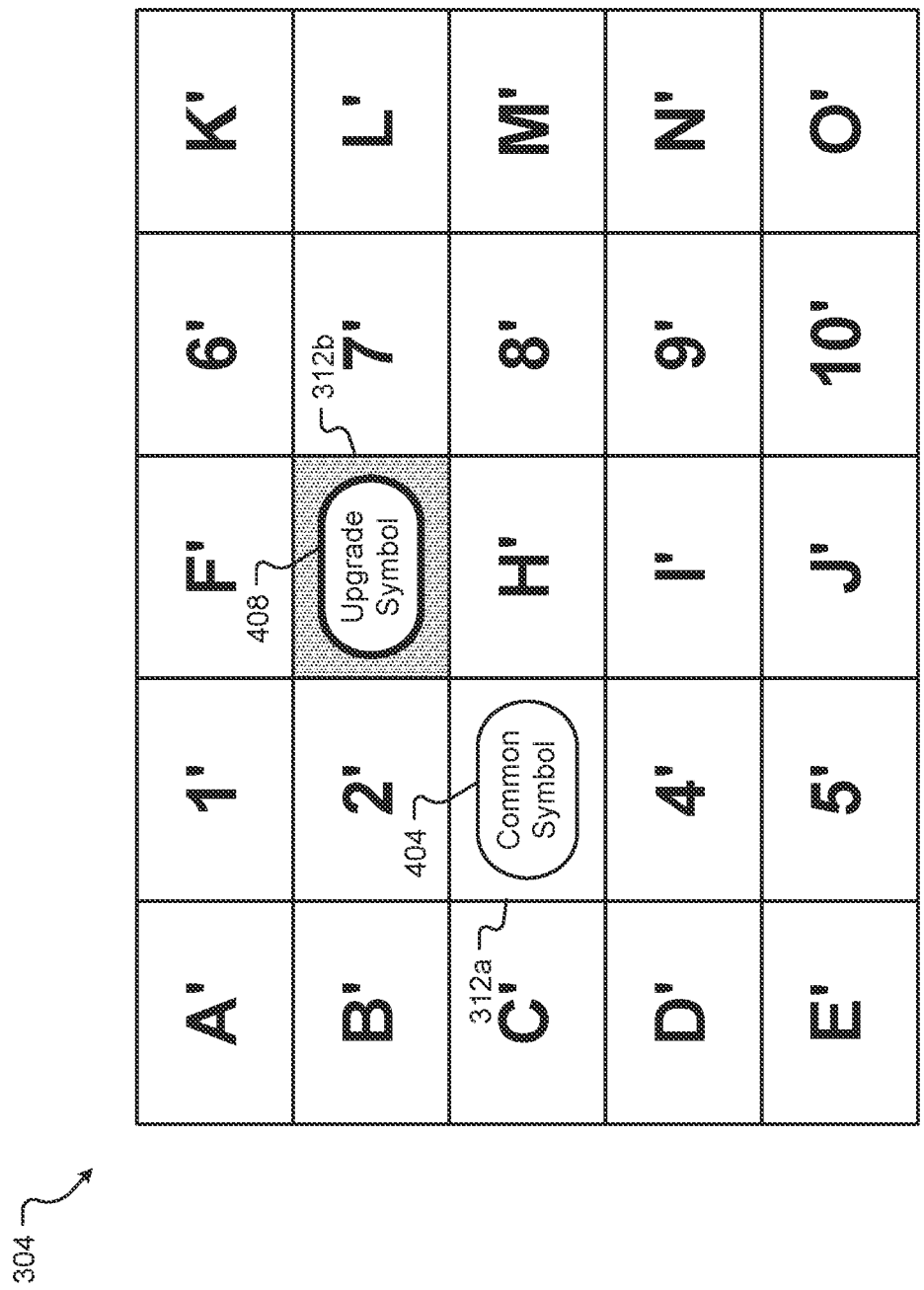
FIG. 7C illustrates a second distribution of symbols after the symbol upgrade operation shown in FIG. 7B is performed and after a respin feature has been invoked.

Referring now to FIGS. 7A-7C, a fourth illustrative game play sequence that can be performed by the processor 204 in response to executing the game instructions 220, the symbol upgrade instructions 228, the symbol removal instructions 232, and/or the respin instructions 236 will be described in accordance with at least some embodiments of the present disclosure.

FIG. 7A illustrates a first cell 312a being diagonally adjacent to a second cell 312b, and both cells including the common symbol 404. Upon identifying the common symbol 404 in adjacent cells 312, the game instructions 220 may invoke the symbol upgrade instructions 228 to select a cell to be upgraded.

FIG. 7B shows an example where the second cell 312b is selected to be upgraded. In this example, the second cell 312b is upgraded to include the upgrade symbol 408 rather than the common symbol 404. This example also shows that the common symbol 404 is still retained in the first cell 312a, which was not upgraded in the same way that the second cell 312b was upgraded. This may correspond to an example where the symbol upgrade instructions 228 were utilized by the symbol removal instructions 232 were not utilized by the game instructions 220.

Once the second cell 312b is upgraded to include the upgrade symbol 408, the respin instructions 236 may be invoked to initiate a respin. The respin may cause a second distribution of symbols 316 to be presented in the array of cells 304 as shown in FIG. 7C. In this particular second distribution of symbols 316, the first cell 312a was not subject to respin and still retains the common symbol 404. Similarly, the second cell 312b was not subject to respin and maintains the upgrade symbol 408 in the second distribution of symbols 316. All other cells 312 in the array of cells 304 is shown to receive a new discrete symbol in the second distribution of symbols 316.

Figure 8:
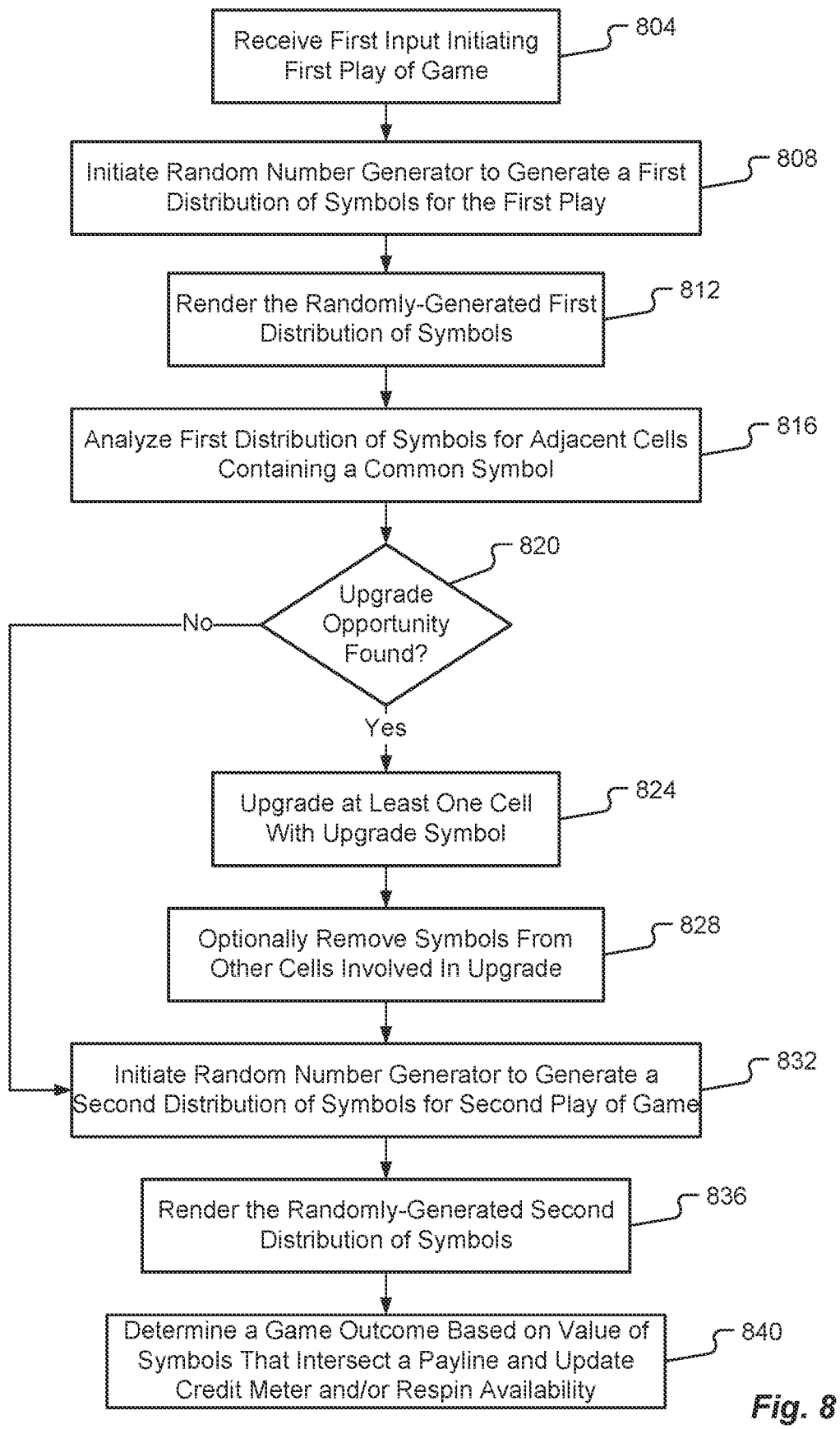
FIG. 8 is a flow diagram of an example process for enabling a symbol upgrade operation in a game.

With reference now to FIG. 8, a flow diagram illustrating a method of performing a symbol upgrade and symbol removal process during a link and respin game feature will be described in accordance with at least some embodiments of the present disclosure. The method begins when a first input is received at the computational device 100 (step 804). The first input may correspond to a player input provided to any one of the input or input/output devices included in the computational device 100. The first input may correspond to a simple press of a button, a press of a screen, a pull of a lever, or any other gesture that is recognizable by the computational device 100. The first input may also include any action performed by the player, which may include a card in action, a coin in action, a ticket in action, etc.

In response to receiving the input, the method continues with the game instructions 220 requesting an output from the random number generator 240 and then using the output received from the random number generator 240 to generate a first distribution of symbols 316 for a first play (step 808). The first distribution of symbols 316 may correspond to an initial spin during gameplay, a respin, a bonus spin, or any other activity supported by the game instructions 220.

The first distribution of symbols may then be rendered by the computational device 100 for display to a player of the computational device 100 (step 812). In some embodiments, the first distribution of symbols may be analyzed by the game instructions 220 to determine if any cells 312 in the array of cells 304 includes a common symbol 404 (step 816). The analysis may initially be performed by searching all symbols 316 in the first distribution of symbols 316 for common symbols 404 and then evaluating whether or not the cells 312 containing the common symbol 404 are adjacent to one another (e.g., diagonal, laterally, vertically, etc.). In another approach, the analysis of step 816 may be performed by analyzing all adjacent cells 312 to determine if any adjacent cells 312 include a common symbol 404.

If the game instructions 220 identify two or more adjacent cells as including a common symbol 404, then the game instructions 220 may determine than an upgrade opportunity is possible for the first distribution of symbols 316 (step 820). In response to detecting an upgrade opportunity based on adjacent cells 312 having a common symbol 404, the method may continue with the game instructions 220 calling the symbol upgrade instructions 228 to upgrade at least one cell 312 in the array of cells 304 to include an upgrade symbol 408 (step 824). The at least one cell 312 that is upgraded to include the upgrade symbol 408 may or may not include a cell 312 that contained the common symbol 404. Likewise, more than one cell 312 may be selected as a cell 312 to be upgraded without departing from the scope of the present disclosure.

The game instructions 220 may also invoke the symbol removal instructions 232 to optionally remove symbols 316 from other cells 312 (step 828). As an example, cells 312 that were involved in the upgrade (e.g., adjacent cells 312 that included the common symbol 404 but were not upgraded to include the upgrade symbol 408) may have their symbols removed at step 828. As another example, some or all cells 312 other than the one selected to be upgraded may have their symbols 316 removed prior to a respin operation.

Thereafter, or in response to determining that no upgrade opportunity was available, the method may continue with the game instructions 220 invoking a respin operation (step 832). In some embodiments, the respin operation may be performed by the respin instructions 236 and may involve requesting another output from the random number generator 240. The output of the random number generator 240 may be used to generate a second distribution of symbols 316 for a second play of the game. This second play may be considered a respin operation or a similar process where the cells 312 other than the cell 312 being upgraded to include the upgrade symbol 408 are subject to receiving new symbols 316. In other words, the upgraded cell 312 may retain the upgrade symbol 408 in the second distribution of cells 316 whereas other cells 312 not subject to upgrade may receive a new discrete symbol 316 in the second distribution of symbols 316.

The second distribution of symbols 316 may then be presented to the player of the computational device 100 by rendering the symbols 316 in the cells 312 subject to the respin (step 836). The method may also involve the game instructions 220 determining one or more game outcomes based on the second distribution of symbols 316 (step 840). As an example, the game outcome may be determined by evaluating a combination of symbols 316 that intersect a payline 120 subject to wager. The combination of symbols 316 that intersect the payline 120 subject to wager may contribute to a determined payout or winning value. In some embodiments, the combination of symbols 316 that intersect the payline 120 may include the upgrade symbol 408. In such a situation, a value associated with the upgrade symbol 408 may be determined by applying a multiplier to a value associated with the common symbol 404. Furthermore, the value associated with the combination of symbols may include at least the value associated with the upgrade symbol 408 as well as any other symbols in the combination of symbols. A credit meter 224 may be updated based on a value of the combination of symbols that intersect the payline 120. Alternatively or additionally, the combination of symbols on the payline 120 may cause the game instructions 220 to determine that additional respin opportunities have been won by the player and further respin availability may be updated with the respin instructions 236.

Figure 9:
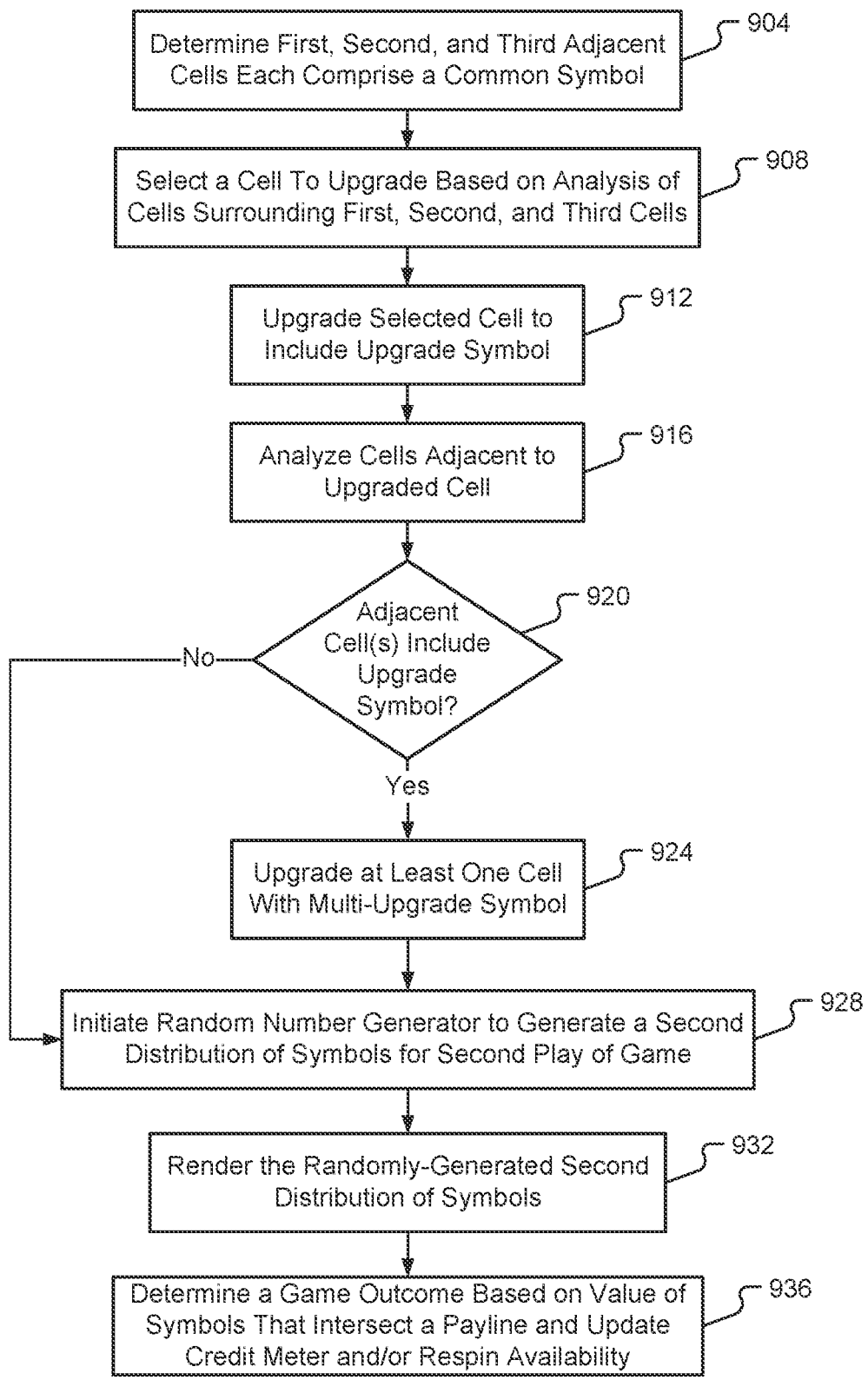
FIG. 9 is a flow diagram of an example process for combining multiple upgrade symbols into a multi-upgrade symbol.

With reference now to FIG. 9, a flow diagram illustrating a method of performing a multi-upgrade process during a link and respin game feature will be described in accordance with at least some embodiments of the present disclosure. The method begins with the game instructions 220 determining that first, second, and third adjacent cells 312 each include a common symbol 404 (step 904). The game instructions 220 may then invoke the symbol upgrade instructions 228 to select a cell to upgrade based on the analysis of cells surrounding the first, second, and third cells 312 (step 908). In particular, the symbol upgrade instructions 228 may search for a cell 312 that, if upgraded, is most likely to result in a further or multi-upgrade opportunity for the player.

The symbol upgrade instructions 228 may then upgrade the selected cell 312 to include an upgrade symbol 408, which represents that the common symbol 404 has been combined into the upgrade symbol 408 (step 912). Following the first upgrade, the game instructions 220 may re-evaluate the array of cells 304 to analyze the cells 312 that are adjacent to the upgraded cell 312 (e.g., the cell 312 that now includes the upgrade symbol 408) (step 916).

Based on the analysis performed in step 916, the game instructions 220 may determine if any of the adjacent cells include the upgrade symbol 408 (step 920). The existence of the upgrade symbol 408 in multiple adjacent cells 312 may be the result of multiple upgrade processes being performed on different sets of adjacent cells 312. Alternatively or additionally, the existence of the upgrade symbol 408 in multiple adjacent cells 312 may be the result of a single upgrade process being performed for one cell 312 and another cell 312 having the upgrade symbol 408 initially assigned thereto after a first gameplay.

If the query of step 920 is answered affirmatively, the symbol upgrade instructions 228 may be invoked to upgrade at least one cell 312 to include a multi-upgrade symbol 604 (step 924). Thereafter, or in the event that the query of step 920 was answered negatively, the method may continue by generating a second distribution of symbols 316 for a second play of the game (step 928). The second distribution of symbols 316 may still include the multi-upgrade symbol 604 in the cell 312 that was upgraded by the symbol upgrade instructions 228 whereas all other cells 312 may be subject to receiving a new symbol 316 based on a random output.

The second distribution of symbols 316 may then be presented to the player of the computational device 100 by rendering the distribution of symbols 316 in the array of cells 304 (step 932). The rendering may be performed with any suitable output device of the computational device 100. The method may also involve the game instructions 220 determining one or more game outcomes based on the second distribution of symbols 316 (step 936). As an example, the game outcome may be determined by evaluating a combination of symbols 316 that intersect a payline 120 subject to wager. The combination of symbols 316 that intersect the payline 120 subject to wager may contribute to a determined payout or winning value. In some embodiments, the combination of symbols 316 that intersect the payline 120 may include the multi-upgrade symbol 604. In such a situation, a value associated with the multi-upgrade symbol 604 may be determined by applying a multiplier to a value associated with the common symbol 404, by applying a multiplier to a value associated with the upgrade symbol 408, or combinations thereof. Furthermore, the value associated with the combination of symbols may include at least the value associated with the multi-upgrade symbol 604 as well as any other symbols in the combination of symbols. A credit meter 224 may be updated based on a value of the combination of symbols that intersect the payline 120. Alternatively or additionally, the combination of symbols on the payline 120 may cause the game instructions 220 to determine that additional respin opportunities have been won by the player and further respin availability may be updated with the respin instructions 236.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming device, comprising:
   a display;
   a processor coupled to the display; and
   a memory coupled with the processor and storing therein instructions that, when executed by the processor, cause the processor to:
   initiate a first play of a game, wherein the game comprises an array of cells;
   render, by the display in response to initiating the first play of the game, a first distribution of symbols in the array of cells, wherein each cell in the array of cells comprises a discrete symbol in the first distribution of symbols;
   determine that the first distribution of symbols comprises a common symbol in a first cell and a second cell;
   upgrade a cell in the array of cells with an upgrade symbol, wherein the upgrade symbol represents that the common symbol in the first cell and the second cell have been combined into the upgrade symbol in response to determining that the first cell and the second cell comprise the common symbol, and wherein the cell that is upgraded with the upgrade symbol comprises the first cell;
   remove the common symbol from the second cell at least until a second play of the game is initiated, wherein the second cell is empty at least until the second play of the game is performed;
   initiate the second play of the game, wherein the second play of the game occurs after the first play of the game; and
   render, by the display in response to initiating the second play of the game, a second distribution of symbols in the array of cells, wherein the cell comprises the upgrade symbol in the second distribution of symbols and wherein cells in the array of cells other than the cell comprise a new discrete symbol in the second distribution of symbols.

2. The gaming device of claim 1, wherein the instructions further cause the processor to:
   generate a game outcome based on the second distribution of symbols in the array of cells; and
   update a credit meter based on the game outcome.

3. The gaming device of claim 2, wherein generating the game outcome comprises:
   determining a location of a payline;
   evaluating a combination of symbols in the second distribution of symbols that intersect the payline; and
   updating the credit meter based on a value associated with the combination of symbols in the second distribution of symbols that intersect the payline.

4. The gaming device of claim 3, wherein the combination of symbols includes the upgrade symbol, wherein a value associated with the upgrade symbol is determined by applying a multiplier to a value associated with the common symbol, and wherein the value associated with the combination of symbols comprises at least the value associated with the upgrade symbol.

5. The gaming device of claim 1, wherein the cells other than the cell include the second cell, wherein removing the common symbol from the second cell subjects the second cell to the second play of the game, and wherein the instructions further cause the processor to:
   determine that a third cell in the first distribution of symbols also comprises the upgrade symbol; and
   upgrade the third cell with a multi-upgrade symbol, wherein the multi-upgrade symbol represents that the upgrade symbol in the first cell and the third cell have been combined into the multi-upgrade symbol in response to determining that the first cell and the third cell comprise the upgrade symbol.

6. The gaming device of claim 1, wherein the instructions further cause the processor to:
   determine that a third cell in the first distribution of symbols comprises the common symbol; and
   assign a value to the upgrade symbol that represent at least three times a value of the common symbol.

7. The gaming device of claim 1, wherein the first cell and the second cell are adjacent to one another and wherein upgrading the cell with the upgrade symbol is conditioned upon the common symbol appearing in adjacent cells.

8. The gaming device of claim 7, wherein the first cell and the second cell are diagonally adjacent to one another.

9. The gaming device of claim 7, wherein the instructions further cause the processor to:
   increase a number of spins available to a player in response to upgrading the cell with the upgrade symbol.

10. The gaming device of claim 1, wherein the first distribution of symbols is determined based on an output of a random number generator (RNG) and wherein all cells in the array of cells other than the cell comprise the new discrete symbol.

11. The gaming device of claim 1, wherein the first play of the game is initiated in response to receiving an input from a player and wherein the second play of the game is automatically initiated in response to upgrading the cell with the upgrade symbol.

12. A method, comprising:
   receiving, by a processor, a first input from a player interacting with a gaming device initiating a first play of a game, wherein the game comprises an array of cells;
   rendering, by a display of the gaming device in response to receiving the first input, a randomly-generated first distribution of symbols in the array of cells, wherein each cell in the array of cells comprises a discrete symbol in the randomly-generated first distribution of symbols;
   determining, with the processor, that the randomly-generated first distribution of symbols comprises a common symbol in a first cell and a second cell;
   upgrading, with the processor, a cell in the array of cells with an upgrade symbol, wherein the upgrade symbol represents that the common symbol in the first cell and the second cell have been combined into the upgrade symbol in response to determining that the first cell and the second cell comprise the common symbol, and wherein the cell that is upgraded with the upgrade symbol comprises the first cell;
   removing the common symbol from the second cell at least until a second play of the game is initiated, wherein the second cell has no symbol presented therein at least until the second play of the game is performed;
   initiating, with the processor, the second play of the game; and
   rendering, by the display in response to initiating the second play of the game, a second distribution of symbols in the array of cells, wherein the cell comprises the upgrade symbol in the second distribution of symbols and wherein cells in the array of cells other than the cell comprise a new discrete symbol in the second distribution of symbols.

13. The method of claim 12, wherein the second play of the game is automatically initiated in response to upgrading the cell with the upgrade symbol.

14. The method of claim 12, further comprising:
   determining, with the processor, a location of a payline relative to the array of cells;
   evaluating, with the processor, a combination of symbols in the second distribution of symbols that intersect the payline; and
   updating a credit meter based on a value associated with the combination of symbols in the second distribution of symbols that intersect the payline.

15. The method of claim 14, wherein the combination of symbols includes the upgrade symbol, wherein a value associated with the upgrade symbol is determined by applying a multiplier to a value associated with the common symbol, and wherein the value associated with the combination of symbols comprises at least the value associated with the upgrade symbol.

16. The method of claim 12, wherein removing the common symbol from the second cell subjects the second cell to receiving a symbol other than the common symbol in the second distribution of symbols, and wherein the method further comprises:
   determining, with the processor, that a third cell in the randomly-generated first distribution of symbols comprises the upgrade symbol; and
   upgrading, with the processor, the third cell with a multi-upgrade symbol, wherein the multi-upgrade symbol represents that the upgrade symbol in the first cell and the third cell have been combined into the multi-upgrade symbol in response to determining that the first cell and the third cell comprise the upgrade symbol.

17. The method of claim 16, wherein the first cell is adjacent to the second cell and adjacent to the third cell, wherein upgrading the first cell with the upgrade symbol is conditioned upon the first cell and the second cell being adjacent to one another and comprising the common symbol, and wherein upgrading the third cell with the multi-upgrade symbol is conditioned upon the first cell and third cell being adjacent to one another and comprising the upgrade symbol.

18. The method of claim 12, further comprising:
   determining, with the processor, that a third cell in the randomly-generated first distribution of symbols comprises the common symbol; and
   assigning, with the processor, a value to the upgrade symbol that represent a value of the common symbol increased with a multiplier.

19. A system, comprising:
a processor; and
a memory, coupled with the processor, comprising instructions that are executable by the processor, wherein the instructions comprise instructions that:
   initiate a first play of a game, wherein the game comprises an array of cells;
   cause a first distribution of symbols to be displayed in the array of cells, wherein each cell in the array of cells comprises a discrete symbol in the first distribution of symbols;
   determine that a first cell and a second cell both comprise a common symbol in the first distribution of symbols;
   determine that the first cell is adjacent to the second cell;
   upgrade the first cell with an upgrade symbol, wherein the upgrade symbol represents that the common symbol in the first cell and the second cell have been combined into the upgrade symbol in response to determining that the first cell and the second cell both comprise the common symbol and in response to determining that the first cell is adjacent to the second cell;
   remove the common symbol from the second cell at least until a second play of the game is initiated, wherein the second cell is empty at least until after the second play of the game;
   initiate the second play of the game, wherein the second play of the game occurs after the first play of the game; and
   cause a second distribution of symbols to be displayed in the array of cells, wherein the first cell comprises the upgrade symbol in the second distribution of symbols and wherein cells in the array of cells other than the first cell comprise a new discrete symbol in the second distribution of symbols.

20. The system of claim 19, wherein the instructions further comprise instructions that:
   determine a location of a payline relative to the array of cells;
   evaluate a combination of symbols in the second distribution of symbols that intersect the payline; and
   update a credit meter based on a value associated with the combination of symbols in the second distribution of symbols that intersect the payline, wherein the combination of symbols includes the upgrade symbol, wherein a value associated with the upgrade symbol is determined by applying a multiplier to a value associated with the common symbol, wherein removing the common symbol from the second cell subjects the second cell to receiving a symbol other than the common symbol in the second distribution of symbols, and wherein the value associated with the combination of symbols comprises at least the value associated with the upgrade symbol.

* * * * *